United States Patent
Shokrollahi et al.

(10) Patent No.: US 10,348,436 B2
(45) Date of Patent: *Jul. 9, 2019

(54) METHOD AND APPARATUS FOR LOW POWER CHIP-TO-CHIP COMMUNICATIONS WITH CONSTRAINED ISI RATIO

(71) Applicant: Kandou Labs, S.A., Lausanne (CH)

(72) Inventors: Amin Shokrollahi, Preverenges (CH); Ali Hormati, Chavannes-pres-Renens (CH); Roger Ulrich, Bern (CH)

(73) Assignee: KANDOU LABS, S.A., Lausanne (CH)

( * ) Notice: Subject to any disclaimer, the term of this patent is extended or adjusted under 35 U.S.C. 154(b) by 139 days.

This patent is subject to a terminal disclaimer.

(21) Appl. No.: 15/019,868

(22) Filed: Feb. 9, 2016

(65) Prior Publication Data

US 2016/0173219 A1 Jun. 16, 2016

Related U.S. Application Data

(63) Continuation of application No. 14/816,899, filed on Aug. 3, 2015, now Pat. No. 9,258,154, which is a
(Continued)

(51) Int. Cl.
*H04L 25/49* (2006.01)
*H04L 25/02* (2006.01)
(Continued)

(52) U.S. Cl.
CPC ........ *H04J 13/004* (2013.01); *H04L 25/0272* (2013.01); *H04L 25/0276* (2013.01);
(Continued)

(58) Field of Classification Search
CPC ..... H04W 88/06; H04W 88/10; H04W 56/00; H04W 56/003; H04W 92/02;
(Continued)

(56) References Cited

U.S. PATENT DOCUMENTS 668,687 A 2/1901 Mayer
780,883 A 1/1905 Hinchman
(Continued)

FOREIGN PATENT DOCUMENTS

CN 1864346 11/2006
CN 101478286 7/2009
(Continued)

OTHER PUBLICATIONS

International Search Report and Written Opinion for PCT/EP2011/059279 dated Sep. 22, 2011.
(Continued)

*Primary Examiner* — Romani Ohri
(74) *Attorney, Agent, or Firm* — Invention Mine LLC

(57) ABSTRACT

An efficient communications apparatus is described for a vector signaling code to transport data and optionally a clocking signal between integrated circuit devices. Methods of designing such apparatus and their associated codes based on a new metric herein called the "ISI Ratio" are described which permit higher communications speed, lower system power consumption, and reduced implementation complexity.

18 Claims, 24 Drawing Sheets

Related U.S. Application Data continuation of application No. 14/612,241, filed on Feb. 2, 2015, now Pat. No. 9,100,232.

(60) Provisional application No. 61/934,804, filed on Feb. 2, 2014.

(51) Int. Cl.
*H04J 13/00* (2011.01)
*H04L 25/03* (2006.01)
*H04L 25/14* (2006.01)

(52) U.S. Cl.
CPC ........ *H04L 25/03343* (2013.01); *H04L 25/14* (2013.01); *H04L 25/4919* (2013.01)

(58) Field of Classification Search
CPC ............. H04L 25/03898; H04L 1/0668; H04L 5/0007; H04L 5/023; H04L 5/026
See application file for complete search history.

(56) References Cited

U.S. PATENT DOCUMENTS

| | | | |
|---|---|---|---|
| 3,196,351 A | 7/1965 | Slepian |
| 4,276,543 A | 6/1981 | Miller |
| 4,499,550 A | 2/1985 | Ray, III |
| 4,722,084 A | 1/1988 | Morton |
| 4,772,845 A | 9/1988 | Scott |
| 4,774,498 A | 9/1988 | Traa |
| 4,864,303 A | 9/1989 | Ofek |
| 4,897,657 A | 1/1990 | Brubaker |
| 4,974,211 A | 11/1990 | Corl |
| 5,017,924 A | 5/1991 | Guiberteau |
| 5,053,974 A | 10/1991 | Penz |
| 5,150,384 A | 9/1992 | Cahill |
| 5,166,956 A | 11/1992 | Baltus |
| 5,168,509 A | 12/1992 | Nakamura |
| 5,266,907 A | 11/1993 | Dacus |
| 5,287,305 A | 2/1994 | Yoshida |
| 5,311,516 A | 5/1994 | Kuznicki |
| 5,331,320 A | 7/1994 | Cideciyan |
| 5,412,689 A | 5/1995 | Chan |
| 5,449,895 A | 9/1995 | Hecht |
| 5,459,465 A | 10/1995 | Kagey |
| 5,461,379 A | 10/1995 | Weinman |
| 5,510,736 A | 4/1996 | Van De Plassche |
| 5,511,119 A | 4/1996 | Lechleider |
| 5,553,097 A | 9/1996 | Dagher |
| 5,566,193 A | 10/1996 | Cloonan |
| 5,599,550 A | 2/1997 | Kohlruss |
| 5,626,651 A | 5/1997 | Dullien |
| 5,629,651 A | 5/1997 | Mizuno |
| 5,659,353 A | 8/1997 | Kostreski |
| 5,727,006 A | 3/1998 | Dreyer |
| 5,748,948 A | 5/1998 | Yu |
| 5,802,356 A | 9/1998 | Gaskins |
| 5,825,808 A | 10/1998 | Hershey |
| 5,875,202 A | 2/1999 | Venters |
| 5,945,935 A | 8/1999 | Kusumoto |
| 5,949,060 A | 9/1999 | Schattscneider |
| 5,995,016 A | 11/1999 | Perino |
| 5,999,016 A | 12/1999 | McClintock |
| 6,005,895 A | 12/1999 | Perino |
| 6,084,883 A | 7/2000 | Norrell |
| 6,119,263 A | 9/2000 | Mowbray |
| 6,154,498 A | 11/2000 | Dabral |
| 6,172,634 B1 | 1/2001 | Leonowich |
| 6,232,908 B1 | 5/2001 | Nakaigawa |
| 6,278,740 B1 | 8/2001 | Nordyke |
| 6,316,987 B1 | 11/2001 | Dally |
| 6,317,465 B1 | 11/2001 | Akamatsu |
| 6,346,907 B1 | 2/2002 | Dacy |
| 6,359,931 B1 | 3/2002 | Perino |
| 6,378,073 B1 | 4/2002 | Davis |
| 6,384,758 B1 | 5/2002 | Michalski |
| 6,398,359 B1 | 6/2002 | Silverbrook |
| 6,417,737 B1 | 7/2002 | Moloudi |
| 6,424,630 B1 | 7/2002 | Ang |
| 6,452,420 B1 | 9/2002 | Wong |
| 6,473,877 B1 | 10/2002 | Sharma |
| 6,483,828 B1 | 11/2002 | Balachandran |
| 6,504,875 B2 | 1/2003 | Perino |
| 6,509,773 B2 | 1/2003 | Buchwald |
| 6,522,699 B1 | 2/2003 | Anderson |
| 6,556,628 B1 | 4/2003 | Poulton |
| 6,563,382 B1 | 5/2003 | Yang |
| 6,621,427 B2 | 9/2003 | Greenstreet |
| 6,624,699 B2 | 9/2003 | Yin |
| 6,661,355 B2 | 12/2003 | Cornelius |
| 6,686,879 B2 | 2/2004 | Shattil |
| 6,690,739 B1 | 2/2004 | Mui |
| 6,766,342 B2 | 7/2004 | Kechriotis |
| 6,772,351 B1 | 8/2004 | Werner |
| 6,839,429 B1 | 1/2005 | Gaikwad |
| 6,839,587 B2 | 1/2005 | Yonce |
| 6,854,030 B2 | 2/2005 | Perino |
| 6,865,234 B1 | 3/2005 | Agazzi |
| 6,865,236 B1 | 3/2005 | Terry |
| 6,876,317 B2 | 4/2005 | Sankaran |
| 6,898,724 B2 | 5/2005 | Chang |
| 6,927,709 B2 | 8/2005 | Kiehl |
| 6,954,492 B1 | 10/2005 | Williams |
| 6,963,622 B2 | 11/2005 | Eroz |
| 6,972,701 B2 | 12/2005 | Jansson |
| 6,973,613 B2 | 12/2005 | Cypher |
| 6,976,194 B2 | 12/2005 | Cypher |
| 6,982,954 B2 | 1/2006 | Dhong |
| 6,990,138 B2 | 1/2006 | Bejjani |
| 6,991,038 B2 | 1/2006 | Guesnon |
| 6,993,311 B2 | 1/2006 | Li |
| 6,999,516 B1 | 2/2006 | Rajan |
| 7,023,817 B2 | 4/2006 | Kuffner |
| 7,075,996 B2 | 7/2006 | Simon |
| 7,080,288 B2 | 7/2006 | Ferraiolo |
| 7,082,557 B2 | 7/2006 | Schauer |
| 7,085,336 B2 | 8/2006 | Lee |
| 7,130,944 B2 | 10/2006 | Perino |
| 7,142,612 B2 | 11/2006 | Horowitz |
| 7,142,865 B2 | 11/2006 | Tsai |
| 7,164,631 B2 | 1/2007 | Tateishi |
| 7,167,019 B2 | 1/2007 | Broyde |
| 7,176,823 B2 | 2/2007 | Zabroda |
| 7,180,949 B2 | 2/2007 | Kleveland |
| 7,184,483 B2 | 2/2007 | Rajan |
| 7,199,728 B2 | 4/2007 | Daily |
| 7,231,558 B2 | 6/2007 | Gentieu |
| 7,269,130 B2 | 9/2007 | Pitio |
| 7,269,212 B1 | 9/2007 | Chau |
| 7,335,976 B2 | 2/2008 | Chen |
| 7,336,112 B1 | 2/2008 | Sha |
| 7,339,990 B2 | 3/2008 | Hidaka |
| 7,346,819 B2 | 3/2008 | Bansal |
| 7,348,989 B2 | 3/2008 | Stevens |
| 7,349,484 B2 | 3/2008 | Stojanovic |
| 7,356,213 B1 | 4/2008 | Cunningham |
| 7,358,869 B1 | 4/2008 | Chiarulli |
| 7,362,130 B2 | 4/2008 | Broyde |
| 7,362,697 B2 | 4/2008 | Becker |
| 7,366,942 B2 | 4/2008 | Lee |
| 7,370,264 B2 | 5/2008 | Worley |
| 7,372,390 B2 | 5/2008 | Yamada |
| 7,389,333 B2 | 6/2008 | Moore |
| 7,397,302 B2 | 7/2008 | Bardsley |
| 7,400,276 B1 | 7/2008 | Sotiriadis |
| 7,428,273 B2 | 9/2008 | Foster |
| 7,456,778 B2 | 11/2008 | Werner |
| 7,462,956 B2 | 12/2008 | Lan |
| 7,496,162 B2 | 2/2009 | Srebranig |
| 7,535,957 B2 | 5/2009 | Ozawa |
| 7,539,532 B2 | 5/2009 | Tran |
| 7,570,704 B2 | 8/2009 | Nagarajan |
| 7,583,209 B1 | 9/2009 | Duan |
| 7,599,390 B2 | 10/2009 | Pamarti |
| 7,613,234 B2 | 11/2009 | Raghavan |

(56) References Cited

U.S. PATENT DOCUMENTS

| | | |
|---|---|---|
| 7,616,075 B2 | 11/2009 | Kushiyama |
| 7,620,116 B2 | 11/2009 | Bessios |
| 7,633,850 B2 | 12/2009 | Ahn |
| 7,639,596 B2 | 12/2009 | Cioffi |
| 7,643,588 B2 | 1/2010 | Visalli |
| 7,650,525 B1 | 1/2010 | Chang |
| 7,656,321 B2 | 2/2010 | Wang |
| 7,694,204 B2 | 4/2010 | Schmidt |
| 7,697,915 B2 | 4/2010 | Behzad |
| 7,698,088 B2 | 4/2010 | Sul |
| 7,706,456 B2 | 4/2010 | Laroia |
| 7,706,524 B2 | 4/2010 | Zerbe |
| 7,746,764 B2 | 6/2010 | Rawlins |
| 7,768,312 B2 | 8/2010 | Hirose |
| 7,787,572 B2 | 8/2010 | Scharf |
| 7,804,361 B2 | 9/2010 | Lim |
| 7,808,883 B2 | 10/2010 | Green |
| 7,826,551 B2 | 11/2010 | Lee |
| 7,841,909 B2 | 11/2010 | Murray |
| 7,859,356 B2 | 12/2010 | Pandey |
| 7,868,790 B2 | 1/2011 | Bae |
| 7,869,497 B2 | 1/2011 | Benvenuto |
| 7,869,546 B2 | 1/2011 | Tsai |
| 7,899,653 B2 | 3/2011 | Hollis |
| 7,907,676 B2 | 3/2011 | Stojanovic |
| 7,933,770 B2 | 4/2011 | Kruger |
| 8,000,664 B2 | 8/2011 | Khorram |
| 8,030,999 B2 | 10/2011 | Chatterjee |
| 8,036,300 B2 | 10/2011 | Evans |
| 8,050,332 B2 | 11/2011 | Chung |
| 8,055,095 B2 | 11/2011 | Palotai |
| 8,085,172 B2 | 12/2011 | Li |
| 8,091,006 B2 | 1/2012 | Prasad |
| 8,106,806 B2 | 1/2012 | Toyomura |
| 8,149,906 B2 | 4/2012 | Saito |
| 8,159,376 B2 | 4/2012 | Abbasfar |
| 8,180,931 B2 | 5/2012 | Lee |
| 8,185,807 B2 | 5/2012 | Oh |
| 8,199,849 B2 | 6/2012 | Oh |
| 8,199,863 B2 | 6/2012 | Chen |
| 8,218,670 B2 | 7/2012 | AbouRjeily |
| 8,233,544 B2 | 7/2012 | Bao |
| 8,245,094 B2 | 8/2012 | Jiang |
| 8,245,102 B1 | 8/2012 | Cory |
| 8,253,454 B2 | 8/2012 | Lin |
| 8,279,094 B2 | 10/2012 | Abbasfar |
| 8,279,976 B2 | 10/2012 | Lin |
| 8,284,848 B2 | 10/2012 | Nam |
| 8,295,250 B2 | 10/2012 | Gorokhov |
| 8,295,336 B2 | 10/2012 | Lutz |
| 8,305,247 B2 | 11/2012 | Pun |
| 8,310,389 B1 | 11/2012 | Chui |
| 8,341,492 B2 | 12/2012 | Shen |
| 8,359,445 B2 | 1/2013 | Ware |
| 8,365,035 B2 | 1/2013 | Hara |
| 8,406,315 B2 | 3/2013 | Tsai |
| 8,429,492 B2 | 4/2013 | Yoon |
| 8,442,099 B1 | 5/2013 | Sederat |
| 8,442,210 B2 | 5/2013 | Zerbe |
| 8,443,223 B2 | 5/2013 | Abbasfar |
| 8,451,913 B2 | 5/2013 | Oh |
| 8,462,891 B2 | 6/2013 | Kizer |
| 8,472,513 B2 | 6/2013 | Malipatil |
| 8,498,344 B2 | 7/2013 | Wilson |
| 8,498,368 B1 | 7/2013 | Husted |
| 8,520,348 B2 | 8/2013 | Dong |
| 8,520,493 B2 | 8/2013 | Goulahsen |
| 8,539,318 B2 | 9/2013 | Cronie |
| 8,547,272 B2 | 10/2013 | Nestler |
| 8,577,284 B2 | 11/2013 | Seo |
| 8,578,246 B2 | 11/2013 | Mittelholzer |
| 8,588,254 B2 | 11/2013 | Diab |
| 8,588,280 B2 | 11/2013 | Oh |
| 8,593,305 B1 | 11/2013 | Tajalli |
| 8,602,643 B2 | 12/2013 | Gardiner |
| 8,604,879 B2 | 12/2013 | Mourant |
| 8,638,241 B2 | 1/2014 | Sudhakaran |
| 8,643,437 B2 | 2/2014 | Chiu |
| 8,649,445 B2 | 2/2014 | Cronie |
| 8,649,556 B2 | 2/2014 | Wedge |
| 8,649,840 B2 | 2/2014 | Sheppard, Jr. |
| 8,674,861 B2 | 3/2014 | Matsuno |
| 8,687,968 B2 | 4/2014 | Nosaka |
| 8,711,919 B2 | 4/2014 | Kumar |
| 8,718,184 B1 | 5/2014 | Cronie |
| 8,773,964 B2 | 7/2014 | Hsueh |
| 8,780,687 B2 | 7/2014 | Clausen |
| 8,782,578 B2 | 7/2014 | Tell |
| 8,791,735 B1 | 7/2014 | Shibasaki |
| 8,831,440 B2 | 9/2014 | Yu |
| 8,841,936 B2 | 9/2014 | Nakamura |
| 8,879,660 B1 | 11/2014 | Peng |
| 8,897,134 B2 | 11/2014 | Kern |
| 8,898,504 B2 | 11/2014 | Baumgartner |
| 8,938,171 B2 | 1/2015 | Tang |
| 8,949,693 B2 | 2/2015 | Ordentlich |
| 8,951,072 B2 | 2/2015 | Hashim |
| 8,975,948 B2 | 3/2015 | GonzalezDiaz |
| 8,996,740 B2 | 3/2015 | Wiley |
| 9,015,566 B2 | 4/2015 | Cronie |
| 9,020,049 B2 | 4/2015 | Schwager |
| 9,036,764 B1 | 5/2015 | Hossain |
| 9,059,816 B1 | 6/2015 | Simpson |
| 9,069,995 B1 | 6/2015 | Cronie |
| 9,077,386 B1 | 7/2015 | Holden |
| 9,083,576 B1 | 7/2015 | Hormati |
| 9,093,791 B2 | 7/2015 | Liang |
| 9,100,232 B1 | 8/2015 | Hormati |
| 9,106,465 B2 | 8/2015 | Walter |
| 9,124,557 B2 | 9/2015 | Fox |
| 9,148,087 B1 | 9/2015 | Tajalli |
| 9,152,495 B2 | 10/2015 | Losh |
| 9,165,615 B2 | 10/2015 | Amirkhany |
| 9,172,412 B2 | 10/2015 | Kim |
| 9,178,503 B2 | 11/2015 | Hsieh |
| 9,183,085 B1 | 11/2015 | Northcott |
| 9,197,470 B2 | 11/2015 | Okunev |
| 9,231,790 B2 | 1/2016 | Wiley |
| 9,281,785 B2 | 3/2016 | Sjoland |
| 9,300,503 B1 | 3/2016 | Holden |
| 9,331,962 B2 | 5/2016 | Lida |
| 9,362,974 B2 | 6/2016 | Fox |
| 9,363,114 B2 | 6/2016 | Shokrollahi |
| 9,374,250 B1 | 6/2016 | Musah |
| 9,401,828 B2 | 7/2016 | Cronie |
| 9,432,082 B2 | 8/2016 | Ulrich |
| 9,432,298 B1 | 8/2016 | Smith |
| 9,444,654 B2 | 9/2016 | Hormati |
| 9,455,744 B2 | 9/2016 | George |
| 9,455,765 B2 | 9/2016 | Schumacher |
| 9,461,862 B2 | 10/2016 | Holden |
| 9,479,369 B1 | 10/2016 | Shokrollahi |
| 9,509,437 B2 | 11/2016 | Shokrollahi |
| 9,520,883 B2 | 12/2016 | Shibasaki |
| 9,537,644 B2 | 1/2017 | Jones |
| 9,544,015 B2 | 1/2017 | Ulrich |
| 9,634,797 B2 | 4/2017 | Benammar |
| 9,667,379 B2 | 5/2017 | Cronie |
| 9,710,412 B2 | 7/2017 | Sengoku |
| 9,917,711 B2 | 3/2018 | Ulrich |
| 2002/0097791 A1 | 7/2002 | Hansen |
| 2002/0152340 A1 | 10/2002 | Dreps |
| 2002/0154633 A1 | 10/2002 | Shin |
| 2002/0167339 A1 | 11/2002 | Chang |
| 2002/0174373 A1 | 11/2002 | Chang |
| 2002/0181607 A1* | 12/2002 | Izumi .............. H04L 5/023 375/295 |
| 2003/0016763 A1 | 1/2003 | Doi |
| 2003/0016770 A1 | 1/2003 | Trans |
| 2003/0046618 A1 | 3/2003 | Collins |
| 2003/0085763 A1 | 5/2003 | Schrodinger |
| 2003/0086366 A1 | 5/2003 | Branlund |
| 2003/0117184 A1 | 6/2003 | Fecteau |
| 2003/0174023 A1 | 9/2003 | Miyasita |

(56) References Cited

U.S. PATENT DOCUMENTS

| | | |
|---|---|---|
| 2003/0185310 A1 | 10/2003 | Ketchum |
| 2003/0218558 A1 | 11/2003 | Mulder |
| 2004/0027185 A1 | 2/2004 | Fiedler |
| 2004/0057525 A1 | 3/2004 | Rajan |
| 2004/0146117 A1 | 7/2004 | Subramaniam |
| 2004/0155802 A1 | 8/2004 | Lamy |
| 2004/0161019 A1 | 8/2004 | Raghavan |
| 2004/0169529 A1 | 9/2004 | Afghahi |
| 2004/0170231 A1 | 9/2004 | Bessios |
| 2004/0239374 A1 | 12/2004 | Hori |
| 2005/0057379 A1 | 3/2005 | Jansson |
| 2005/0134380 A1 | 6/2005 | Nairn |
| 2005/0195000 A1 | 9/2005 | Parker |
| 2005/0201491 A1 | 9/2005 | Wei |
| 2005/0213686 A1* | 9/2005 | Love .................. H04B 7/0417 375/299 |
| 2005/0220182 A1 | 10/2005 | Kuwata |
| 2005/0270098 A1 | 12/2005 | Zhang |
| 2006/0013331 A1 | 1/2006 | Choi |
| 2006/0036668 A1 | 2/2006 | Jaussi |
| 2006/0097786 A1 | 5/2006 | Su |
| 2006/0103463 A1 | 5/2006 | Lee |
| 2006/0126751 A1 | 6/2006 | Bessios |
| 2006/0140324 A1 | 6/2006 | Casper |
| 2006/0159005 A1 | 7/2006 | Rawlins |
| 2006/0233291 A1 | 10/2006 | Garlepp |
| 2007/0001723 A1 | 1/2007 | Lin |
| 2007/0002954 A1 | 1/2007 | Cornelius |
| 2007/0030796 A1 | 2/2007 | Green |
| 2007/0103338 A1 | 5/2007 | Teo |
| 2007/0164883 A1 | 7/2007 | Furtner |
| 2007/0182487 A1 | 8/2007 | Ozasa |
| 2007/0188367 A1 | 8/2007 | Yamada |
| 2007/0194848 A1 | 8/2007 | Bardsley |
| 2007/0201546 A1 | 8/2007 | Lee |
| 2007/0204205 A1 | 8/2007 | Niu |
| 2007/0265533 A1 | 11/2007 | Tran |
| 2007/0283210 A1 | 12/2007 | Prasad |
| 2008/0007367 A1 | 1/2008 | Kim |
| 2008/0012598 A1 | 1/2008 | Mayer |
| 2008/0013622 A1 | 1/2008 | Bao |
| 2008/0016432 A1 | 1/2008 | Lablans |
| 2008/0192621 A1 | 8/2008 | Suehiro |
| 2008/0317188 A1 | 12/2008 | Staszewski |
| 2009/0046009 A1 | 2/2009 | Fujii |
| 2009/0115523 A1 | 5/2009 | Akizuki |
| 2009/0150754 A1 | 6/2009 | Dohmen |
| 2009/0195281 A1 | 8/2009 | Tamura |
| 2009/0251222 A1 | 10/2009 | Khorram |
| 2009/0262876 A1 | 10/2009 | Arima |
| 2009/0316730 A1 | 12/2009 | Feng |
| 2009/0323864 A1 | 12/2009 | Tired |
| 2010/0023838 A1 | 1/2010 | Shen |
| 2010/0081451 A1* | 4/2010 | Mueck .................. G01S 5/0045 455/456.1 |
| 2010/0148819 A1 | 6/2010 | Bae |
| 2010/0215112 A1 | 8/2010 | Tsai |
| 2010/0215118 A1 | 8/2010 | Ware |
| 2010/0235673 A1 | 9/2010 | Abbasfar |
| 2010/0271107 A1 | 10/2010 | Tran |
| 2010/0283894 A1 | 11/2010 | Horan |
| 2010/0296556 A1 | 11/2010 | Rave |
| 2010/0309964 A1 | 12/2010 | Oh |
| 2011/0028089 A1 | 2/2011 | Komori |
| 2011/0032977 A1 | 2/2011 | Hsiao |
| 2011/0072330 A1 | 3/2011 | Kolze |
| 2011/0074488 A1 | 3/2011 | Broyde |
| 2011/0103508 A1 | 5/2011 | Mu |
| 2011/0150495 A1 | 6/2011 | Nosaka |
| 2011/0228864 A1 | 9/2011 | Aryanfar |
| 2011/0268225 A1* | 11/2011 | Cronie .............. H04L 25/0272 375/296 |
| 2011/0286497 A1* | 11/2011 | Nervig .............. H04L 5/0021 375/147 |
| 2011/0291758 A1 | 12/2011 | Hsieh |
| 2011/0299555 A1* | 12/2011 | Cronie ................. H04L 1/0041 370/476 |
| 2011/0302478 A1* | 12/2011 | Cronie ................... H03M 5/04 714/777 |
| 2012/0008662 A1 | 1/2012 | Gardiner |
| 2012/0036415 A1 | 2/2012 | Shafrir |
| 2012/0082203 A1 | 4/2012 | Zerbe |
| 2012/0133438 A1 | 5/2012 | Tsuchi |
| 2012/0152901 A1 | 6/2012 | Nagorny |
| 2012/0161945 A1 | 6/2012 | Single |
| 2012/0213299 A1* | 8/2012 | Cronie ................. H04L 1/0041 375/259 |
| 2013/0010892 A1 | 1/2013 | Cronie |
| 2013/0013870 A1* | 1/2013 | Cronie ............... G06F 11/1068 711/154 |
| 2013/0049863 A1 | 2/2013 | Chiu |
| 2013/0088274 A1 | 4/2013 | Gu |
| 2013/0106513 A1 | 5/2013 | Cyrusian |
| 2013/0114392 A1* | 5/2013 | Sun ........................ H04J 13/18 370/208 |
| 2013/0114519 A1* | 5/2013 | Gaal .................. H03G 3/3078 370/329 |
| 2013/0114663 A1 | 5/2013 | Ding |
| 2013/0129019 A1 | 5/2013 | Sorrells |
| 2013/0147553 A1 | 6/2013 | Iwamoto |
| 2013/0159584 A1* | 6/2013 | Nygren ............... G06F 13/4273 710/305 |
| 2013/0188656 A1 | 7/2013 | Ferraiolo |
| 2013/0195155 A1 | 8/2013 | Pan |
| 2013/0202065 A1 | 8/2013 | Chmelar |
| 2013/0215954 A1 | 8/2013 | Beukema |
| 2013/0229294 A1 | 9/2013 | Matsuno |
| 2013/0259113 A1 | 10/2013 | Kumar |
| 2013/0271194 A1 | 10/2013 | Pellerano |
| 2013/0307614 A1 | 11/2013 | Dai |
| 2013/0314142 A1 | 11/2013 | Tamura |
| 2013/0315501 A1 | 11/2013 | Atanassov |
| 2013/0346830 A1 | 12/2013 | Ordentlich |
| 2014/0068391 A1 | 3/2014 | Goel |
| 2014/0159769 A1 | 6/2014 | Hong |
| 2014/0177645 A1 | 6/2014 | Cronie |
| 2014/0177696 A1 | 6/2014 | Hwang |
| 2014/0198841 A1 | 7/2014 | George |
| 2014/0226455 A1 | 8/2014 | Schumacher |
| 2014/0266440 A1 | 9/2014 | Itagaki |
| 2014/0269130 A1 | 9/2014 | Maeng |
| 2014/0286381 A1 | 9/2014 | Shibasaki |
| 2015/0010044 A1 | 1/2015 | Zhang |
| 2015/0049798 A1 | 2/2015 | Hossein |
| 2015/0070201 A1 | 3/2015 | Dedic |
| 2015/0117579 A1 | 4/2015 | Shibasaki |
| 2015/0146771 A1 | 5/2015 | Walter |
| 2015/0222458 A1 | 8/2015 | Hormati |
| 2015/0236885 A1 | 8/2015 | Ling |
| 2015/0249559 A1 | 9/2015 | Shokrollahi |
| 2015/0333940 A1 | 11/2015 | Shokrollahi |
| 2015/0349835 A1 | 12/2015 | Fox |
| 2015/0380087 A1 | 12/2015 | Mittelholzer |
| 2015/0381232 A1 | 12/2015 | Ulrich |
| 2016/0020796 A1 | 1/2016 | Hormati |
| 2016/0020824 A1 | 1/2016 | Ulrich |
| 2016/0036616 A1 | 2/2016 | Holden |
| 2016/0197747 A1 | 7/2016 | Ulrich |
| 2016/0261435 A1 | 9/2016 | Musah |
| 2017/0310456 A1 | 10/2017 | Tajalli |
| 2017/0317449 A1 | 11/2017 | Shokrollahi |
| 2017/0317855 A1 | 11/2017 | Shokrollahi |

FOREIGN PATENT DOCUMENTS

| | | |
|---|---|---|
| CN | 101820288 | 9/2010 |
| CN | 101854223 | 10/2010 |
| EP | 1926267 | 5/2008 |
| JP | 2003163612 | 6/2003 |
| WO | 2005002162 | 1/2005 |
| WO | 2009084121 | 7/2009 |

(56) References Cited

FOREIGN PATENT DOCUMENTS

| WO | 2010031824 | 3/2010 |
|---|---|---|
| WO | 2011119359 | 9/2011 |
| WO | 2039221 | 2/2013 |

OTHER PUBLICATIONS

International Search Report and Written Opinion for PCT/EP2011/074219 dated Jul. 4, 2012.
International Search Report and Written Opinion for PCT/EP2012/052767 dated May 11, 2012.
International Search Report and Written Opinion for PCT/US14/052986 dated Nov. 24, 2014.
Abbasfar, A., "Generalized Differential Vector Signaling", IEEE International Conference on Communications, ICC '09, (Jun. 14, 2009), pp. 1-5.
Brown, L., et al., "V.92: The Last Dial-Up Modem?", IEEE Transactions on Communications, IEEE Service Center, Piscataway, NJ., USA, vol. 52, No. 1, Jan. 1, 2004, pp. 54-61. XP011106836, ISSN: 0090-6779, DOI: 10.1109/tcomm.2003.822168, pp. 55-59.
Burr, "Spherical Codes for M-ARY Code Shift Keying", University of York, Apr. 2, 1989, pp. 67-72, United Kingdom.
Cheng, W., "Memory Bus Encoding for Low Power: A Tutorial", Quality Electronic Design, IEEE, International Symposium on Mar. 26-28, 2001, pp. 199-204, Piscataway, NJ.
Clayton, P., "Introduction to Electromagnetic Compatibility", Wiley-Interscience, 2006.
Dasilva et al., "Multicarrier Orthogonal CDMA Signals for Quasi-Synchronous Communication Systems", IEEE Journal on Selected Areas in Communications, vol. 12, No. 5 (Jun. 1, 1994), pp. 842-852.
Ericson, T., et al., "Spherical Codes Generated by Binary Partitions of Symmetric Pointsets", IEEE Transactions on Information Theory, vol. 41, No. 1, Jan. 1995, pp. 107-129.
Farzan, K., et al., "Coding Schemes for Chip-to-Chip Interconnect Applications", IEEE Transactions on Very Large Scale Integration (VLSI) Systems, vol. 14, No. 4, Apr. 2006, pp. 393-406.
Healey, A., et al., "A Comparison of 25 Gbps NRZ & PAM-4 Modulation used in Legacy & Premium Backplane Channels", DesignCon 2012, 16 pages.
International Search Report and Written Opinion from PCT/US2014/034220 dated Aug. 21, 2014.
International Search Report and Written Opinion of the International Searching Authority, dated Jul. 14, 2011 in International Patent Application S.N. PCT/EP2011/002170, 10 pages.
International Search Report and Written Opinion of the International Searching Authority, dated Nov. 5, 2012, in International Patent Application S.N. PCT/EP2012/052767, 7 pages.
International Search Report for PCT/US2014/053563, dated Nov. 11, 2014, 2 pages.
Notification of Transmittal of the International Search Report and the Written Opinion of the International Searching Authority, or the Declaration for PCT/EP2013/002681, dated Feb. 25, 2014, 15 pages.
Poulton, et al., "Multiwire Differential Signaling", UNC-CH Department of Computer Science Version 1.1, Aug. 6, 2003.
She et al., "A Framework of Cross-Layer Superposition Coded Multicast for Robust IPTV Services over WiMAX," IEEE Communications Society subject matter experts for publication in the WCNC 2008 proceedings, Mar. 31, 2008-Apr. 3, 2008, pp. 3139-3144.
Skliar et al., A Method for the Analysis of Signals: the Square-Wave Method, Mar. 2008, Revista de Matematica: Teoria y Aplicationes, pp. 109-129.
Slepian, D., "Premutation Modulation", IEEE, vol. 52, No. 3, Mar. 1965, pp. 228-236.
Stan, M., et al., "Bus-Invert Coding for Low-Power I/O, IEEE Transactions on Very Large Scale Integration (VLSI) Systems", vol. 3, No. 1, Mar. 1995, pp. 49-58.
Tallini, L., et al., "Transmission Time Analysis for the Parallel Asynchronous Communication Scheme", IEEE Transactions on Computers, vol. 52, No. 5, May 2003, pp. 558-571.
Wang et al. "Applying CDMA Technique to Network-on-Chip", IEEE Transactions on Very Large Scale Integration (VLSI) Systems, vol. 15, No. 10 (Oct. 1, 2007), pp. 1091-1100.
"Introduction to: Analog Computers and the DSPACE System," Course Material ECE 5230 Spring 2008, Utah State University, www.coursehero.com, 12 pages.
Counts, L., et al., "One-Chip Slide Rule Works with Logs, Antilogs for Real-Time Processing," Analog Devices Computational Products 6, Reprinted from Electronic Design, May 2, 1985, 7 pages.
Design Brief 208 Using the Anadigm Multiplier CAM, Copyright 2002 Anadigm, 6 pages.
Grahame, J., "Vintage Analog Computer Kits," posted on Aug. 25, 2006 in Classic Computing, 2 pages, http.//www.retrothing.com/2006/08/classic_analog_.html.
Jiang, A., et al., "Rank Modulation for Flash Memories", IEEE Transactions of Information Theory, Jun. 2006, vol. 55, No. 6, pp. 2659-2673.
Loh, M., et al., "A 3×9 Gb/s Shared, All-Digital CDR for High-Speed, High-Density I/O", Matthew Loh, IEEE Journal of Solid-State Circuits, Vo. 47, No. 3, Mar. 2012.
Notification of Transmittal of International Search Report and the Written Opinion of the International Searching Authority, for PCT/US2015/018363, dated Jun. 18, 2015, 13 pages.
Notification of Transmittal of the International Search Report and the Written Opinion of the International Searching Authority, or the Declaration, dated Mar. 3, 2015, for PCT/US2014/066893, 9 pages.
Notification of Transmittal of the International Search Report and the Written Opinion of the International Searching Authority, or the Declaration, for PCT/US2014/015840, dated May 20, 2014, 11 pages.
Notification of Transmittal of the International Search Report and the Written Opinion of the International Searching Authority, or the Declaration, for PCT/US2014/043965, dated Oct. 22, 2014, 10 pages.
Notification of Transmittal of the International Search Report and the Written Opinion of the International Searching Authority, or the Declaration, for PCT/US2015/037466, dated Nov. 19, 2015.
Notification of Transmittal of the International Search Report and the Written Opinion of the International Searching Authority, or the Declaration, for PCT/US2015/039952, dated Sep. 23, 2015, 8 pages.
Notification of Transmittal of the International Search Report and the Written Opinion of the International Searching Authority, or the Declaration, for PCT/US2015/041161, dated Oct. 7, 2015, 8 pages.
Notification of Transmittal of the International Search Report and the Written Opinion of the International Searching Authority, or the Declaration, for PCT/US2015/043463, dated Oct. 16, 2015, 8 pages.
Oh, et al., Pseudo-Differential Vector Signaling for Noise Reduction in Single-Ended Signaling, DesignCon 2009.
Schneider, J., et al., "ELEC301 Project: Building an Analog Computer," Dec. 19, 1999, 8 pages, http://www.clear.rice.edu/elec301/Projects99/anlgcomp/.
Tierney, J., et al., "A digital frequency synthesizer," Audio and Electroacoustics, IEEE Transactions, Mar. 1971, pp. 48-57, vol. 19, Issue 1, 1 page Abstract from http://ieeexplore.
Zouhair Ben-Neticha et al, "The 'streTched'-Golay and other codes for high-SNR finite-delay quantization of the Gaussian source at ½ Bit per sample, IEEE Transactions on Communications, vol. 38, No. 12 Dec. 1, 1990, pp. 2089-2093, XP000203339, ISSN: 0090-6678, DOI: 10.1109/26.64647.
Holden, B., "An exploration of the technical feasibility of the major technology options for 400GE backplanes", IEEE 802.3 400GE Study Group, Jul. 16, 2013, 18 pages, http://ieee802.org/3/400GSG/public/13_07/holden_400_01_0713.pdf.
Holden, B., "Using Ensemble NRZ Coding for 400GE Electrical Interfaces", IEEE 802.3 400GE Study Group, May 17, 2013, 24 pages, http://www.ieee802.org/3/400GSG/public/13_05/holden_400_01_0513.pdf.

(56) References Cited

OTHER PUBLICATIONS

Holden, B., "Simulation results for NRZ, ENRZ & PAM-4 on 16-wire full-sized 400GE backplanes", IEEE 802.3 400GE Study Group, Sep. 2, 2013, 19 pages, www.ieee802.0rg/3/400GSG/publiv/13_09/holden_400_01_0913.pdf.

Giovaneli, et al., "Space-frequency coded OFDM system for multi-wire power line communications", Power Line Communications and Its Applications, 20015 International Symposium on Vancouver, BC, Canada, Apr. 6-8, 2005, Piscataway, NJ, pp. 191-195.

Shibasaki, et al., "A 56-Gb/s Receiver Front-End with a CTLE and 1-Tap DFE in 20-nm CMOS", IEEE 2014 Symposium on VLSI Circuits Digest of Technical Papers, 2 pgs.

Hidaka, et al., "A 4-Channel 1.25-10.3 Gb/s Backplane Transceiver Macro With 35 dB Equalizer and Sign-Based Zero-Forcing Adaptive Control", IEEE Journal of Solid-State Circuits, vol. 44 No. 12, Dec. 2009, pp. 3547-3559.

\* cited by examiner

Mix [ 1/3 1/3 1/3  -1/3 -1/3 -1/3 ]

CML with EQ

CML no EQ

Mix [ 1/3 1/3 1/3  -1/3 -1/3 -1/3 ]

Mix [ 1/2 1/2 -1 0 0 0 ]

CML with EQ

CML no EQ

Mix [ 1 -1 0 0 0 0 ]

CML with EQ

CML no EQ

METHOD AND APPARATUS FOR LOW POWER CHIP-TO-CHIP COMMUNICATIONS WITH CONSTRAINED ISI RATIO

This application is a Continuation of and claims priority under 35 USC § 120 to U.S. application Ser. No. 14/816,899, filed Aug. 3, 2015, which is a Continuation of U.S. application Ser. No. 14/612,241, filed Feb. 2, 2015, entitled "Method and Apparatus for Low Power Chip-to-Chip Communications with Constrained ISI Ratio" which is a non-provisional application claiming priority under 35 USC § 119 to U.S. Provisional Application 61/934,803, entitled "Method for Code Evaluation using ISI Ratio," filed on Feb. 2, 2014, all of which are hereby incorporated herein by reference in their entirety for all purposes.

REFERENCES

The following references are herein incorporated by reference in their entirety for all purposes:

U.S. Patent Publication 2011/0268225 of application Ser. No. 12/784,414, filed May 20, 2010, naming Harm Cronie and Amin Shokrollahi, entitled "Orthogonal Differential Vector Signaling" (hereinafter "Cronie I");

U.S. patent application Ser. No. 13/030,027, filed Feb. 17, 2011, naming Harm Cronie, Amin Shokrollahi and Armin Tajalli, entitled "Methods and Systems for Noise Resilient, Pin-Efficient and Low Power Communications with Sparse Signaling Codes", hereinafter identified as [Cronie II];

U.S. patent application Ser. No. 14/158,452, filed Jan. 17, 2014, naming John Fox, Brian Holden, Peter Hunt, John D Keay, Amin Shokrollahi, Richard Simpson, Anant Singh, Andrew Kevin John Stewart, and Giuseppe Surace, entitled "Chip-to-Chip Communication with Reduced SSO Noise", hereinafter identified as [Fox I];

U.S. patent application Ser. No. 14/178,051, filed Feb. 11, 2014, naming John Fox, Brian Holden, Peter Hunt, John D Keay, Amin Shokrollahi, Richard Simpson, Andrew Kevin John Stewart, Giuseppe Surace, and Roger Ulrich, entitled "Methods and Systems for High Bandwidth Chip-to-Chip Communications Interface", hereinafter identified as [Fox II];

U.S. patent application Ser. No. 13/842,740, filed Mar. 15, 2013, naming Brian Holden, Amin Shokrollahi and Anant Singh, entitled "Methods and Systems for Skew Tolerance in and Advanced Detectors for Vector Signaling Codes for Chip-to-Chip Communication", hereinafter identified as [Holden I];

U.S. Provisional Patent Application 61/839,360, filed Jun. 23, 2013, naming Amin Shokrollahi, entitled "Vector Signaling with Reduced Receiver Complexity" (hereinafter "Shokrollahi I");

U.S. Provisional Patent Application No. 61/839,360, filed Jun. 23, 2013, naming Amin Shokrollahi, entitled "Vector Signaling Codes with Reduced Receiver Complexity", hereinafter identified as [Shokrollahi II].

U.S. Provisional Patent Application No. 61/946,574, filed Feb. 28, 2014, naming Amin Shokrollahi, Brian Holden, and Richard Simpson, entitled "Clock Embedded Vector Signaling Codes", hereinafter identified as [Shokrollahi III].

U.S. Provisional Patent Application No. 62/015,172, filed Jul. 10, 2014, naming Amin Shokrollahi and Roger Ulrich, entitled "Vector Signaling Codes with Increased Signal to Noise Characteristics", hereinafter identified as [Shokrollahi IV].

U.S. patent application Ser. No. 13/895,206, filed May 15, 2013, naming Roger Ulrich and Peter Hunt, entitled "Circuits for Efficient Detection of Vector Signaling Codes for Chip-to-Chip Communications using Sums of Differences", hereinafter identified as [Ulrich I].

U.S. Provisional Patent Application No. 62/026,860, filed Jul. 21, 2014, naming Roger Ulrich and Amin Shokrollahi, entitled "Bus Reversible Orthogonal Differential Vector Signaling Codes", hereinafter identified as [Ulrich II].

U.S. patent application Ser. No. 14/315,306, filed Jun. 25, 2014, naming Roger Ulrich, entitled "Multilevel Driver for High Speed Chip-to-Chip Communications", hereinafter identified as [Ulrich III].

The following additional references to prior art have been cited in this application:

U.S. Pat. No. 7,053,802, filed Apr. 22, 2004 and issued May 30, 2006, naming William Cornelius, entitled "Single-Ended Balance-Coded Interface with Embedded-Timing", hereinafter identified as [Cornelius];

U.S. Pat. No. 8,649,460, filed Mar. 11, 2010 and issued Feb. 11, 2014, naming Frederick Ware and Jade Kizer, entitled "Techniques for Multi-Wire Encoding with an Embedded Clock", hereinafter identified as [Ware].

FIELD OF THE INVENTION

The present invention relates generally to the field of communications, and more particularly to the transmission and reception of signals capable of conveying information within and between devices.

BACKGROUND

In communication systems, a goal is to transport information from one physical location to another. It is typically desirable that the transport of this information is reliable, is fast and consumes a minimal amount of resources. One common information transfer medium is the serial communications link, which may be based on a single wire circuit relative to ground or other common reference, or multiple such circuits relative to ground or other common reference. A common example uses singled-ended signaling ("SES"). SES operates by sending a signal on one wire, and measuring the signal relative to a fixed reference at the receiver. A serial communication link may also be based on multiple circuits used in relation to each other. A common example of the latter uses differential signaling ("DS"). Differential signaling operates by sending a signal on one wire and the opposite of that signal on a matching wire. The signal information is represented by the difference between the wires, rather than their absolute values relative to ground or other fixed reference.

There are a number of signaling methods that maintain the desirable properties of DS while increasing pin efficiency over DS. Vector signaling is a method of signaling. With vector signaling, a plurality of signals on a plurality of wires is considered collectively although each of the plurality of signals might be independent. Each of the collective signals is referred to as a component and the number of plurality of wires is referred to as the "dimension" of the vector. In some embodiments, the signal on one wire is entirely dependent on the signal on another wire, as is the case with DS pairs, so in some cases the dimension of the vector might refer to the number of degrees of freedom of signals on the plurality of wires instead of exactly the number of wires in the plurality of wires.

Any suitable subset of a vector signaling code denotes a "subcode" of that code. Such a subcode may itself be a vector signaling code. With binary vector signaling, each component or "symbol" of the vector takes on one of two possible values. With non-binary vector signaling, each symbol has a value that is a selection from a set of more than two possible values. The set of all values required to represent all symbols is called the "alphabet" of the code. Thus, as examples, a binary vector signaling code requires at least an alphabet of two values, while a ternary vector signaling code requires at least an alphabet of three values. When transmitted as physical signals on a communications medium, symbols may be represented by particular physical values appropriate to that medium; as examples, in one embodiment a voltage of 150 mV may represent a "+1" symbol and a voltage of 50 mV may represent a "−1" symbol, while in another embodiment "+1" may be represented by 800 mV and "−1" as −800 mV.

A vector signaling code, as described herein, is a collection C of vectors of the same length N, called codewords. The ratio between the binary logarithm of the size of C and the length N is called the pin-efficiency of the vector signaling code. The Orthogonal Differential Vector Signaling or ODVS codes of [Cronie I], [Cronie II], [Fox I], [Shokrollahi I], [Shokrollahi II], and [Shokrollahi III] are examples of vector signaling codes, and are used herein for descriptive purposes.

Inter-symbol interference (ISI) is the distortion of a symbol to be decoded at the receiver by the residual effects of symbols previously sent through the system. This effect is mainly due to properties of the underlying communication channel, and often is the limiting characteristic precluding higher speed or lower error communications. Well-known examples of channels vulnerable to ISI include wireless communications with multipath interference and band-limited channels in wired systems. Since ISI degradation is deterministic, it is advisable to cancel its effect before trying to decode the current symbol to obtain its embedded information. In some cases, a sequence of previously-sent symbols that constructively combine to maximize their impact on the detection margin of the current symbol. Since these worst-case symbol patterns usually occur with a high probability compared to the target error-rate of the system, their effect and how to quantify and minimize their destructive behavior is a major concern in the design of communication systems. Beyond such ad-hoc identification of problematic patterns, there is no reliable metric to assess the impact of ISI on communications system performance, nor to suggest channel or coding modifications to mitigate such effects.

One way to combat the ISI problem is to use equalizers which render the equivalent channel ISI-free. Equalizers are functional processing blocks or circuits that try to invert the channel in such a way that the transmitted data at each symbol interval becomes (ideally) independent of the other symbols sent through the system. In a Serializer-Deserializer (SerDes) design, FIR (Finite Impulse Response filtering) and CTLE (Continuous Time Linear Equalization) are two well-known linear equalization methods used respectively at the transmitter and receiver sides of the system while DFE (Decision Feedback Equalization) is a receiver-side non-linear equalization method. Other equalization methods such as the Tomlinson-Harashima precoding method are also known to practitioners of the field. Such pre-coding is often equivalent to equalization at the transmitter. On one hand, equalizers can be expensive in terms of implementation complexity, power consumption, and calibration requirements, especially in multi-gigabit/s communication systems. Thus, there is a need for both metrics that accurately reflect the impact of ISI on communications system performance, and for channel processing solutions that mitigate ISI effects in an efficient, high performance manner.

BRIEF DESCRIPTION

An efficient communications apparatus is described for a vector signaling code to transport data and optionally a clocking signal between integrated circuit devices. Methods of designing such apparatus and their associated codes based on a new metric herein called the "ISI Ratio" are described which permit higher communications speed, lower system power consumption, and reduced implementation complexity.

DETAILED DESCRIPTION

Figure 1:
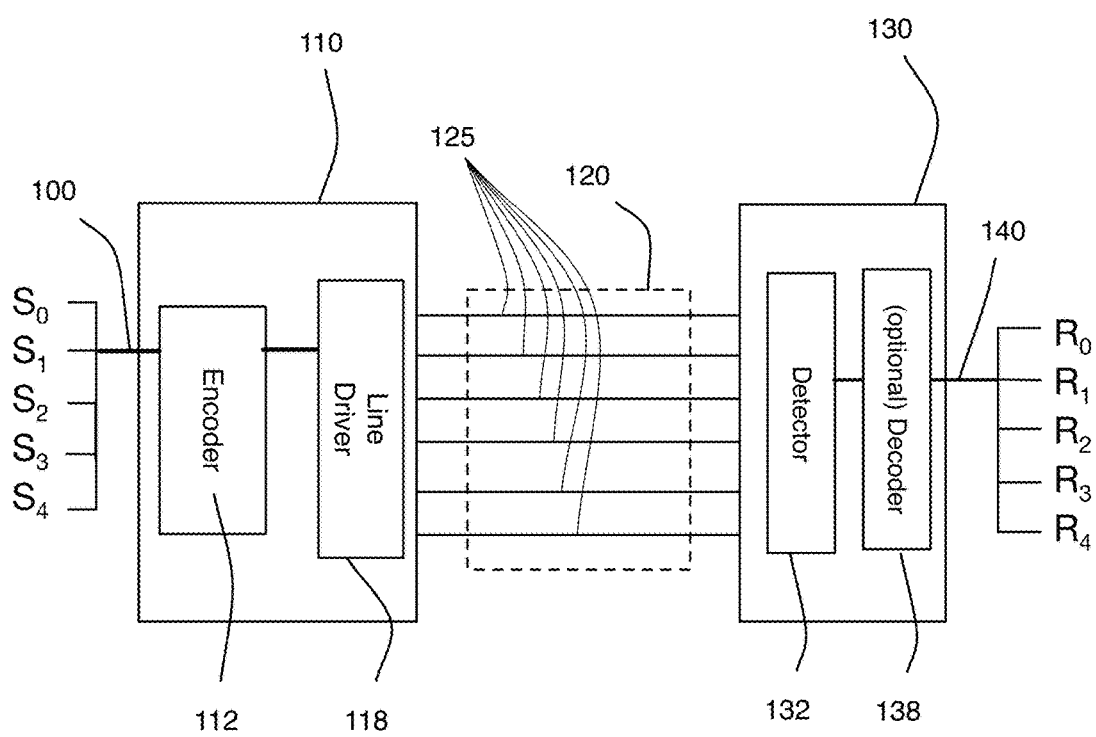
FIG. 1 illustrates an embodiment of a communications system in accordance with the invention.

FIG. 1 illustrates an embodiment of a communication system in accordance with the invention employing a vector signaling code. Source data to transmitter 110, herein illustrated as $S_0$, $S_1$, $S_2$, $S_3$, $S_4$ enters as a source data word 100 into encoder 112. The size of the source data word may vary and depends on the parameters of the vector signaling code. The encoder 112 generates a codeword of the vector signaling code for which the system is designed. In operation, the codeword produced by encoder 112 is used to control PMOS and NMOS transistors within driver 118, generating two, three, or more distinct voltages or currents on each of the N communication wires 125 of communications channel 120, to represent the N symbols of the codeword. In the embodiment of FIG. 1, the size of the source data word is shown as five bits and the codeword size is six symbols. Thus, communications channel 110 is shown as being comprised of six signal wires 125, each transporting one codeword symbol. One familiar with the encoding arts may also describe this code as having a block length of six (i.e. producing an output word of six symbols) and a code size of 32 (i.e. having 32 distinct codewords, sufficient to encode 5 binary bits of data.)

Within communications receiver 130, detector 132 reads the voltages or currents on wires 125, possibly including amplification, frequency compensation, and common mode signal cancellation. In the present example, the received results 140, herein shown as $R_0$, $R_1$, $R_2$, $R_3$, $R_4$, are provided directly by detector 132, without need of optional decoder 138.

As will be readily apparent, different codes may be associated with different block sizes and different codeword sizes; for descriptive convenience and without implying limitation, the example of FIG. 1 illustrates a system using an ODVS code capable of encoding five binary bit values for transmission over six wires, a so-called 5b6w code.

Depending on which vector signaling code is used, there may be no decoder, or no encoder, or neither a decoder nor an encoder. For example, for the 8b8w code disclosed in [Cronie II], both encoder 112 and decoder 138 exist. On the other hand, for the 5b6w code of the present example, an explicit decoder is unnecessary, as the system may be configured such that detector 132 generates the received results 140 directly.

The operation of the communications transmitter 110 and communications receiver 130 have to be completely synchronized in order to guarantee correct functioning of the communication system. In some embodiments, this synchronization is performed by an external clock shared between the transmitter and the receiver. Other embodiments may combine the clock function with one or more of the data channels, as in the well-known Biphase encoding used for serial communications, or other methods described herein.

Signaling in a Communications System

Signaling is a method of transmitting information over communication channels. Any form of mapping information (typically represented as bits) to physical quantities that are carried on the communication channel is referred to as signaling. In preferred embodiments, information to be conveyed on a communication channel is modulated through a shaped pulse having a real-valued function of finite support. The signals transmitted on the wires are of the form $$\Sigma_{i=-\infty}^{+\infty} C_i P(t-iT)$$ [Eqn. 1]

where $C_i$ is the codeword vector of length N (equal to the number of wires), T is the temporal length of a unit interval (UI) of the pulse representing one transmitted value, and P is a function on the interval [0,T] defining the pulse shape used for modulation. The codewords $C_i$ determine the information sent at every instance. The choice of the set to which the $C_i$ belongs, together with the choice of the mapping between the information bits and the $C_i$ determines the signaling method.

Pulse amplitude modulation (PAM) is a method of signaling in which the $C_i$ can take one of the values $[-1, -1+2/(X-1), -1+4/(X-1), \ldots, 1-4/(X-1), 1-2/(X-1), 1]$ representing equal amplitude intervals over the allowable signal range. This type of signaling is referred to as PAM-X signaling. Often (but not exclusively), X is a power of 2, and each $C_i$ carries log 2(X) (binary logarithm of X) information bits. In many high-speed SerDes applications, X=2, though values such as X=4, X=8, or X=16 have also been proposed in various standards bodies.

It is well known to those of skill in the art that while PAM-X signaling leads to a higher ratio of transmitted bits per unit interval, it is more susceptible to ISI than PAM-2. This is often falsely attributed to the fact that in PAM-X signaling has more possible transition extents (i.e. changes in signal amplitude,) with the different amounts of time needed to traverse these extents leading to the increased ISI. Based on this false premise, it has also often been suggested that any signaling method that uses an alphabet size larger than 2 will suffer from ISI more than PAM-2. However, we subsequently show the alphabet size does not directly impact ISI.

A vector signaling code, as described here, is a collection C of vectors of the same dimension N, called codewords, a second collection Λ of vectors of dimension N, called multi-input comparators (MIC's), and a set of "don't cares" wherein each don't care is a pair $C_i$, λ, with $C_i$ being an element of C and λ being an element of Λ. In operation, the coordinates of the elements of C are bounded, and we choose to represent them by real numbers between −1 and 1.

In operation, a codeword is uniquely determined by the vector of the scalar products of that codeword with all the MIC's λ for which $C_i$, λ is not a don't care. If a pair $C_i$, λ is not a don't care, we say that $C_i$ is active for MIC λ.

An example is provided as follows: the collection C of codewords consists of the 12 vectors obtained from the permutations of the vector (1,0,0,−1), the MIC's are the six vectors (1,−1,0,0), (1,0,−1,0), (1,0,0,−1), (0,1,−1,0), (0,1,0,−1), (0,0,1,−1)

and the set of don't cares are those pairs of codewords and MIC's such that the scalar product of the MIC with the codeword is zero. In other words, the don't cares are the pairs ((1,0,0,−1), (0,1,−1,0)), ((1,0,−1,0), (0,1,0,−1)), ((1,−1,0,0), (0,0,1,−1)), ((0,1,−1,0),(1,0,0,−1)), ((0,1,0,−1), (1,0,−1,0)), ((0,0,1,−1),(1,−1,0,0)), ((0,0,−1,1), (1,−1,0,0)), (1,−1,0,0)), ((0,−1,1,0),(1,0,0,−1)), ((0,−1,0,1),(1,0,−1,0)), ((−1,0,0,1),(0,1,−1,0)), ((−1,0,1,0), (0,1,0,−1)), ((−1,1,0,0),(0,0,1,−1)).

In the following we will use interchangeably the interpretation of a MIC being defined as a vector, and as a hyper-plane given by the set of all points orthogonal to this vector.

The ISI problem is examined from this signaling point of view with the intent to determine how to transfer data in a manner less sensitive to the uncorrected residual ISI in the system. In situations where the detection of signals is achieved using comparisons of signal values to fixed references or to one another, the ISI susceptibility shown to be primarily determined by the signal levels observed at the output of these comparators, rather than by the signal levels observed on the wires themselves. We introduce the concept of the ISI-Ratio, a metric that will help us quantify the effect of the ISI noise as a function of the signaling and the detection methods used. We will use this concept to design vector signaling methods that are robust against ISI noise and will show simulation results confirming this approach.

Receivers Using Multi-input Comparators

As described in [Holden I], a practical embodiment of a multi-input comparator or MIC with coefficients $\alpha_0, \alpha_1, \ldots, \alpha_{m-1}$ is a summation circuit that accepts as its input a vector $(x_0, x_1, \ldots, x_{m-1})$ from a plurality of signal conductors and outputs $$\text{Result} = (\alpha_0 * x_0 + \ldots + \alpha_{m-1} * x_{m-1}) \quad \text{(Eqn. 2)}$$

where $(x_0 \ldots x_{m-1})$ is the signal weight vector for the summation circuit. In many embodiments, the desired output is a binary value, thus the value Result is sliced with an analog comparator or other such signal slicer circuit to produce a binary decision output. Because this is a common use case, the colloquial name of this circuit incorporates the term "comparator", although other embodiments may apply the summation result to a PAM-3 or PAM-4 slicer to obtain ternary or quaternary outputs, or indeed may retain the analog output of Eqn. 2 for further computation.

Receivers Described in Matrix Notation

Mathematically, the set of multi-input comparators comprising a code receiver may be concisely described using matrix notation, with the columns of the matrix corresponding to consecutive elements of input vector $(x_0, x_1, \ldots, x_{m-1})$ i.e. the plurality of signal conductor or wire inputs carrying the vector signaling code, and each row of the matrix corresponding to the vector defining a particular multi-input comparator and its output. In this notation, the value of matrix element corresponds to the weight vector or set of scaling factors applied to that column's input values by that row's multi-input comparator.

The matrix of Eqn. 3 describes one such set of multi-input comparators comprising a code receiver.

$$\begin{pmatrix} 1 & 1 & 1 & 1 & 1 & 1 \\ 1 & -1 & 0 & 0 & 0 & 0 \\ \frac{1}{2} & \frac{1}{2} & -1 & 0 & 0 & 0 \\ 0 & 0 & 0 & 1 & -1 & 0 \\ 0 & 0 & 0 & \frac{1}{2} & \frac{1}{2} & -1 \\ \frac{1}{3} & \frac{1}{3} & \frac{1}{3} & -\frac{1}{3} & -\frac{1}{3} & -\frac{1}{3} \end{pmatrix} \quad \text{(Eqn. 3)}$$

In this embodiment, six input wires, represented by the six matrix columns, are processed by five multi-input comparators represented by matrix rows 2-6. For purposes to be subsequently described, the first matrix row is comprised of all "1" values, creating a square 6×6 matrix.

As used herein, a matrix M such as that of Eqn. 3 is called "orthogonal" if $M^T M = D$ that is, if the product of the matrix and its transpose is a diagonal matrix having non-zero values only on its diagonal. This is a weaker definition than commonly used, where the result is required to be the identity matrix, i.e. having diagonal values equal to 1. Matrix M may be normalized to satisfy the stronger conventional orthogonality requirement, but as will subsequently be described such normalization is neither necessary nor desirable in practice.

Functionally, orthogonality requires that the vector of weights in a row representing a multi-input comparator be orthogonal to all other rows, and that each row representing a multi-input comparator sums to zero. As this implies the comparator outputs are also orthogonal (and therefore independent,) they represent distinct communications modes, herein described as "sub-channels" of the Vector Signaling Code communications system.

Given this modal interpretation, the initial row of the matrix may be seen to represent the common-mode communications channel over the transmission medium. As it is desirable in a practical system for the receiver to have common-mode rejection, the first row is set to all "1" values, maximizing the common mode contribution of each wire input to this one matrix row. As by definition all rows of the matrix are orthogonal, it follows that no other matrix row (i.e. no receiver output) may then be impacted by common mode signals. Embodiments having such common mode rejection need not implement a physical comparator corresponding to the first row of their descriptive matrix.

For avoidance of confusion, it is noted that all data communications in an ODVS system, including the state changes representing signals carried in sub-channels, are communicated as codewords over the entire channel. An embodiment may associate particular mappings of input values to codewords and correlate those mappings with particular detector results, as taught herein and by [Holden I] and [Ulrich I], but those correlations should not be confused with partitions, sub-divisions, or sub-channels of the physical communications medium itself. Similarly, the concept of ODVS sub-channels is not limited by the example embodiment to a particular ODVS code, transmitter embodiment, or receiver embodiment. Encoders and/or decoders maintaining internal state may also be components of embodiments in accordance with the invention. Sub-channels may be represented by individual signals, or by states communicated by multiple signals.

[Shokrollahi II] describes methods of constructing orthogonal matrices that may be utilized as described herein.

Generating ODVS Codes Corresponding to a Receiver Matrix

As described in [Cronie I] and [Cronie II], an Orthogonal Differential Vector Signaling code may be constructed from a generator matrix by multiplication of an input modulation vector of the form $(0, \alpha_1, \alpha_2, \ldots \alpha_n)$ by the matrix M In the simplest case, each $\alpha_i$ of this vector is the positive or negative of a single value, as example ±1, representing one bit of transmitted information.

Given our understanding of M as describing the various communications modes of the system, it may readily be seen that multiplication of the matrix by such an input vector comprises excitation of the various modes by the $\alpha_i$, of that vector, with the zeroth mode corresponding to common mode transmission not being excited at all. It will be obvious to one familiar with the art that transmission energy emitted in the common mode is both unnecessary and wasteful in most embodiments. However, in at least one embodiment in accordance with the invention, a nonzero amplitude for the common mode term is used to provide a nonzero bias or baseline value across the communications channel.

It also may be seen that the various codewords of the code generated using this method represent linear combinations of the various orthogonal communication modes. Without additional constraints being imposed (e.g., for purposes of implementation expediency,) this method results in systems capable of communicating N−1 distinct sub-channels over N wires, typically embodied as a N−1 bit/N wire system. The set of discrete codeword values needed to represent the encoded values is called the alphabet of the code, and the number of such discrete alphabet values is its alphabet size.

As a further example, the code generated by this method from the matrix of Eqn. 3 is shown in Table 1.

TABLE 1

| | |
|---|---|
| ±[1, ⅓, −⅓, −1, −⅓, ⅓] | ±[1, ⅓, −⅓, ⅓, −1, −⅓] |
| ±[⅓, 1, −⅓, −1, −⅓, ⅓] | ±[⅓, 1, −⅓, ⅓, −1, −⅓] |
| ±[⅓, −⅓, 1, −1, −⅓, ⅓] | ±[⅓, −⅓, 1, ⅓, −1, −⅓] |
| ±[−⅓, ⅓, 1, −1, −⅓, ⅓] | ±[−⅓, ⅓, 1, ⅓, −1, −⅓] |
| ±[1, ⅓, −⅓, −1, ⅓, −⅓] | ±[1, ⅓, −⅓, ⅓, −⅓, −1] |
| ±[⅓, 1, −⅓, −1, ⅓, −⅓] | ±[⅓, 1, −⅓, ⅓, −⅓, −1] |
| ±[⅓, −⅓, 1, −1, ⅓, −⅓] | ±[⅓, −⅓, 1, ⅓, −⅓, −1] |
| ±[−⅓, ⅓, 1, −1, ⅓, −⅓] | ±[−⅓, ⅓, 1, ⅓, −⅓, −1] |

As may be readily observed, the alphabet of this code consists of the values +1, +⅓, −⅓, −1, thus this is a quaternary code (e.g. having an alphabet size of four.) This code will subsequently be described herein as the 5b6w or "Glasswing" code, and its corresponding receive matrix of Eqn. 3 as the "Glasswing receiver".

Timing Information on a Sub-channel

As an ODVS communications system must communicate each combination of data inputs as encoded transmissions, and the rate of such encoded transmissions is of necessity constrained by the capacity of the communications medium, the rate of change of the data to be transmitted must be within the Nyquist limit, where the rate of transmission of codewords represents the sampling interval. As one example, a binary clock or strobe signal may be transmitted on an ODVS sub-channel, if it has no more than one clock edge per codeword transmission.

An embodiment of an ODVS encoder and its associated line drivers may operate asynchronously, responding to any changes in data inputs. Other embodiments utilize internal timing clocks to, as one example, combine multiple phases of data processing to produce a single high-speed output stream. In such embodiments, output of all elements of a codeword is inherently simultaneous, (absent any logic delay or other implementation constrain,) thus a strobe or clock signal being transported on a sub-channel of the code will be seen at the receiver as a data-aligned clock (e.g. with its transition edges occurring simultaneous to data edges on other sub-channels of the same code.) Methods are well known in the art to convert such a data-aligned clock into a delayed or center-of-eye-aligned clock, suitable for initiating sampling of data sub-channels in combination with the present invention. Such methods may include introduction of a fixed time delay, adjustable time delay, delay-locked loop, etc.

ISI-ratio

The ISI-Ratio is a measure of the sensitivity of a signaling scheme to the inter-symbol interference in a communication system. It is in a sense a measure for the deterioration of a signaling scheme due to residual uncorrected ISI.

To formalize the above definition, assume that we have N communication wires. At each Unit Interval (called UI in the following), the Encoder picks one out of K possible codewords of length N (based on the bits to be sent) and the drivers create voltages/currents proportional to the coordinate values of the codeword and drive the wires with those values. Without implying limitation, we assume in this example that a rectangular pulse shape $P_r$ is used for the value on each wire. The codewords travel on the channel towards the receiver. On the receiver side, the wire values may pass through an equalizer and possibly a gain stage at the Rx front-end, and these new values are combined in (possibly) multiple linear ways in the comparator network to arrive at a set of decision values. As discussed before, the comparators may take linear combinations of wire values and compare them against fixed references, or against other linear combinations of wire values. The receiver comparator network has M MIC's. The MIC's can be conveniently described as "affine linear forms" on the wire values. In other words, to each MIC is associated a set of coefficients $\alpha_0, \alpha_1, \ldots, \alpha_n$. In operation, the output of the MIC is the sign of the expression $\alpha_0 + \alpha_1 x_1 + \ldots + \alpha_n x_n$ where $x_1, \ldots, x_n$ are the values on wires $1, \ldots, N$, respectively, and $-\alpha_0$ is the corresponding reference value. We call the MIC "central" if its reference value is 0. Otherwise we call the MIC non-central. A central MIC is often also written as the vector of the coefficients of its linear form, i.e., as $[\alpha_0, \alpha_1, \ldots, \alpha_n]$. Central MIC's can be of two flavors: reference-less MIC's and referenced MIC's. A reference-less MIC is a central MIC for which the sum of its coefficients is zero.

For example, in standard differential signaling, the MIC coefficients are simply the pair [+1, −1] with the result compared against 0. This is a central reference-less MIC. In PAM-4 signaling, the same MIC is used, but two of the three MIC's have references. In other words, if the largest signal value is 1 and the smallest signal value is −1, the MIC's are given by the following 3 affine linear forms:

$$x_1 - x_2 - \tfrac{2}{3}, x_1 - x_2, x_1 - x_2 + \tfrac{2}{3} \qquad \text{[Eqn. 4]}$$

In general, some of the coefficients of a MIC may be zero, in which case their corresponding inputs are simply discarded.

At times, it is advantageous to use a geometric view of a MIC, by considering a MIC as a hyper-plane in the N-dimensional Euclidean space. The MIC is then identified with the set of all vectors that evaluate to 0 for that MIC. For example, for the MIC [1,−1] with reference 0 the hyper-plane is just the line x=y in the two-dimensional Euclidean plane. We will often and interchangeably identify MIC's with their corresponding vectors, or their associated hyper-planes. In this geometric view, a MIC is central if its hyper-plane passes through the origin, and it is non-central if not.

Each of the K codewords in the code can be interpreted as points in an N dimensional Euclidean space. The task of the MIC's is to separate the points. A MIC that is not a don't care for two codewords separates the points if the points lie on opposite sides of the hyper-plane corresponding to the MIC.

Figure 2:
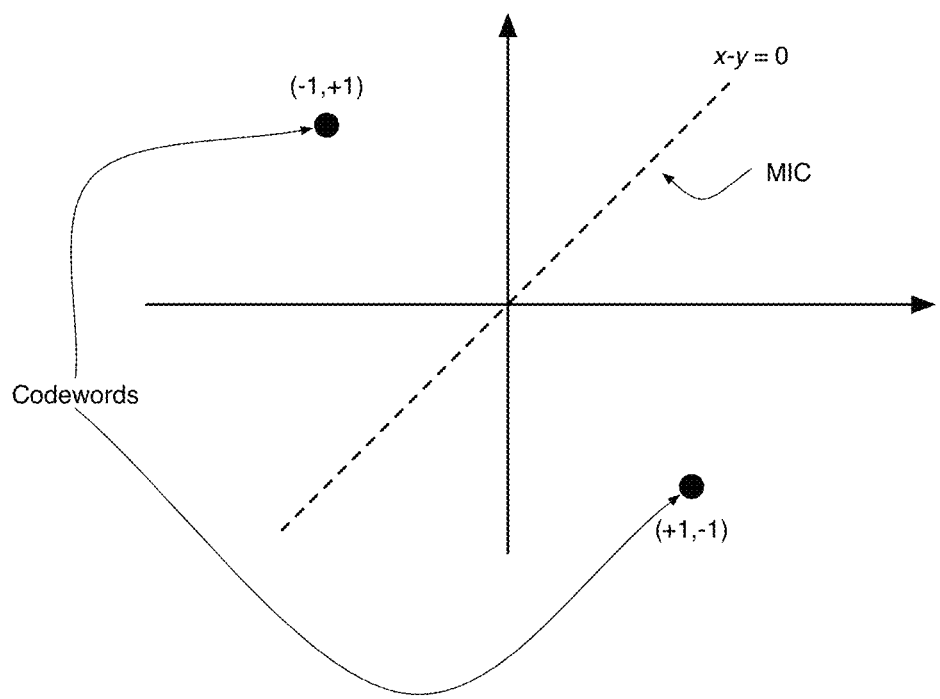
FIG. 2 shows the case of differential signaling on two wires sending one bit per symbol.
Figure 3:
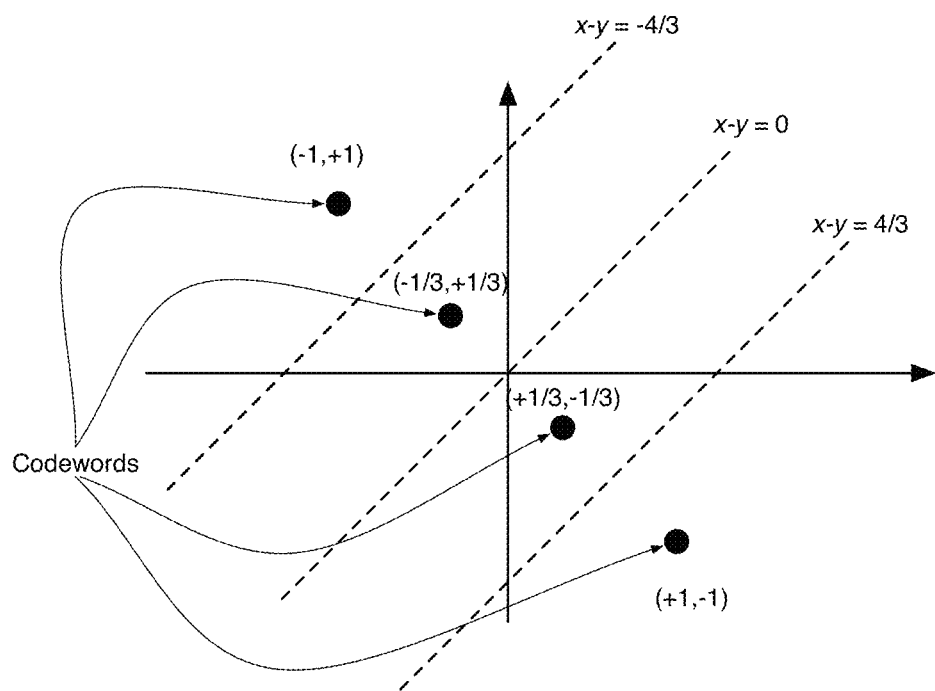
FIG. 3 shows the case of PAM-4 signaling on two wires sending two bits per symbol.

FIGS. 2 and 3 show the case of differential and PAM-4 signaling on two wires sending one and two bits per symbol, respectively. In the case of differential signaling, shown in FIG. 2, the hyper-plane is the line of angle 45 degrees passing through the origin, and the codewords are the points with coordinates (1,−1) and (−1,1). These codewords are separated by the hyper-plane, and they have equal distance from the hyper-plane. For PAM-4 signaling as shown in FIG. 3, the hyper-planes are the line of angle 45 degrees passing through the origin, and the two translations of this line by the vectors (⅔, −⅔) and (−⅔, ⅔). The codewords are the points (1,−1), (⅓,−⅓), (−⅓, ⅓) and (−1,1), all lying on the line perpendicular to the MIC's. As can be seen, the MIC's separate the codewords.

We will show new signaling methods designed based on the ISI-Ratio concept. The ISI-Ratio is defined for a MIC λ, with respect to the set C of codewords. Let $\Delta_m$ be the set of codeword indices that are active for MIC m (i.e., they are not don't cares for that MIC). In order to precisely define the ISI-Ratio, we need to distinguish the central MIC's (where the hyper-plane passes through the origin) and non-central MICs (where the hyper-plane does not pass through the origin as in the two MICs in the PAM-4 signaling) separately.

ISI-Ratio Calculation for Central MICs

Let $d(C_k, MIC_m)$ be the distance between codeword $C_k$ and the hyper-plane representing $MIC_m$. The ISI-Ratio for $MIC_m$ is defined as:

$$ISIRatio(m) = \frac{\max_{1 \leq k \leq K} d(C_k, MIC_m)}{\min_{k \in \Delta_m} d(C_k, MIC_m)}. \quad [\text{Eqn. 5}]$$

Geometrically, the ISI-Ratio may be seen to be the ratio of the maximum distance of any active codeword to the MIC hyper-plane, to the minimum distance of any active codeword to the MIC hyper plane. If we compute this quantity for the signaling examples above, we obtain the following numbers:

Differential Signaling:
 ISI-Ratio is 1 for the MIC.
PAM-4 Signaling:
 ISI-Ratio is 3 for the middle MIC (which is central).

These values may be verified by examining the differential signaling case of FIG. 2, where the two codeword points are equidistant from the MIC plane, representing a max/min distance ratio of 1. In the PAM-4 signaling of FIG. 3, a ratio of 3:1 is seen in the distances of the farthest to nearest codeword points to the central MIC plane.

Other examples will be presented addressing signaling design based on ISI-Ratio.

ISI-Ratio Calculation for Non-Central MICs

Let $d(C_k, MIC_m)$ be the distance between codeword $C_k$ and the hyper-plane representing the referenced $MIC_m$. Denote by $d_0(C_k, MIC_m)$ the distance between the codeword $C_k$ and the shifted version of $MIC_m$ passing through the origin. Then, the ISI-Ratio for the non-central $MIC_m$ is defined as:

$$ISIRatio(m) = \frac{\max_{1 \leq k \leq K} d_0(C_k, MIC_m)}{\min_{k \in \Delta_m} d(C_k, MIC_m)}. \quad [\text{Eqn. 6}]$$

By this formula, the ISI-Ratio for the two non-central MICs of PAM-4 signaling is also equal to 3. Therefore, the ISI-Ratio of all the MICs in a PAM-4 communication system is 3.

ISI-Ratio and Horizontal Eye-Opening

Each of the k codewords $C_k$ k=1, . . . , K generates a pulse response of its own at the output of $MIC_m$ which is given by:

$$P_{m,k}(t) = \Sigma_{rx=1}^{N} MIC_m(rx)[\Sigma_{tx=1}^{N} C_k(tx)P(t)*h_{rx,tx}(t)] \quad [\text{Eqn. 7}]$$

Under the assumption that there is negligible crosstalk in the system and the channels $h_{i,j}(t)$ are all equal (=h(t)), the pulse response generated by codeword K at the output of $MIC_m$ is given by:

$$P_{m,k}(t) = [\Sigma_{i=1}^{N} MIC_m(i) C_k(i)] P_h(t) \quad [\text{Eqn. 8}]$$

where $P_h(t) = P(t)*h(t)$ is the pulse response of the system, including all the linear equalizers, $MIC_m(i)$ is the i-th coordinate of the m-th MIC, and $C_k(i)$ is the i-th coordinate of the codeword $C_k$. Assuming that the MIC is central and its coefficients are normalized such that their sum of squares is equal to 1, the quantity $|\Sigma_{i=1}^{N} MIC_m(i) C_k(i)|$ represents the distance between the codeword K and the central hyper-plane representing $MIC_m$. Note that the ISI-Ratio is invariant under nonzero scalar multiplications of the MIC's by arbitrary nonzero real numbers. Therefore, it can be assumed that the vectors representing the MIC's have norm 1 (i.e., the sum of squares of their coefficients is 1).

The signal at the output of $MIC_m$ is the super-position of the pulse responses $P_{m,k}(t)$ shifted in time by integer multiples of the UI length (=T) and for arbitrary choices of the codewords. Let us assume that $t_0$ is the reference sampling time for the codeword $C_0$. At time $t_0$ we have $$r_m(t_0) = \Sigma_k P_{m,k}(t_0 - kT) = \Sigma_k [\Sigma_{i=1}^{N} MIC_m(i) C_k(i)] P_h(t_0 - kT). \quad [\text{Eqn. 9}]$$

For a central MIC, the receiver eye at the MIC output is closed for the sampling time t in which $r_m(t)$ changes sign with respect to its sign at $t_0$. This determines the horizontal opening of the eye at the MIC output. For many communication systems, the goal is to achieve very low detection error rates at the receiver (e.g., less than $10^{-12}$) and therefore, it is the worst-case codeword pattern that determines the eye-opening. The worst-case codeword pattern occurs when the codeword to be detected is the closest codeword to the hyper-plane representing $MIC_m$ (we call it $C_{min}(m)$) and the pre- and post-cursor codewords are at the farthest distance (we call it $C_{max}(m)$) from that hyper-plane. Choosing these codewords, we can write:

$$r_m(t_0) = d(C_{min}(m), MIC_m) P_h(t_0) - \quad [\text{Eqn. 10}]$$
$$\sum_k d(C_{max}(m), MIC_m) P_h(t_0 - kT)$$
$$= d(C_{min}(m), MIC_m)[P_h(t_0) - ISIRatio * \Sigma_k P_h(t_0 - kT)]$$

By changing the sampling phase $t_0$, the eye closes whenever the term $$P_h(t_0) - ISIRatio * \Sigma_k P_h(t_0 - kT) \quad [\text{Eqn. 11}]$$

changes sign. The higher the ISI-Ratio for the signaling scheme, the bigger the residual ISI we see from the neighboring codewords and the eye will close sooner. Note that for a given pulse response $P_h(t)$ (determined by the channel, equalizers, transmitter pulse-shape and the baud-rate of the system), the horizontal opening depends only on the ISI-Ratio of the underlying signaling scheme. The higher the ISI-Ratio, the smaller the horizontal opening of the eye.

For the case of non-central signaling, it is the distance to the reference of the MIC, denoted by ref(m) that determines the horizontal opening of the eye. Therefore, Eqn. 8 is changed to:

$$r_m(t_0) = \left| \sum_{i=1}^{N} MIC_m(i)C_{min}(i) - ref(m)P_h(t_0) - \sum_k d_0(C_{max}(m), MIC_m) \right| P_h(t_0 - kt)$$

$$= d(C_{min}(m), MIC_m)[P_h(t_0) - ISIRatio * \Sigma_k P_h(t_0 - kT)]$$

[Eqn. 12]

again showing that the horizontal eye-opening is solely determined by the ISI-Ratio of the underlying MIC.

Signaling Design Based on the ISI-Ratio Metric

Based on the discussion above, we can design signaling schemes based on the ISI-Ratio concept. For purposes of description, examples are drawn from the domain of wire-line transmission systems, although no limitation is implied.

As a first example, we wish to send b bits of information over a channel, thus requiring us to have at least $2^b$ codewords in our signaling scheme. We have also the following considerations in our design:

The dimension N is equal to the number of wires (i.e. independent communications elements or sub-channels) in the channel.

The codewords have all their coordinates in the range [−1, 1] because of voltage swing constraints at the transmitter.

The goal is to find the codewords, the MICs, and the don't care pairs, such that the codewords can be distinguished by these MICs and the maximum ISI-Ratio of the MICs is minimized. As shown in the previous section, the MIC with the highest ISI-Ratio will dominate and the horizontal opening of its corresponding eye will determine the error rate of the entire communication system.

Figure 4:
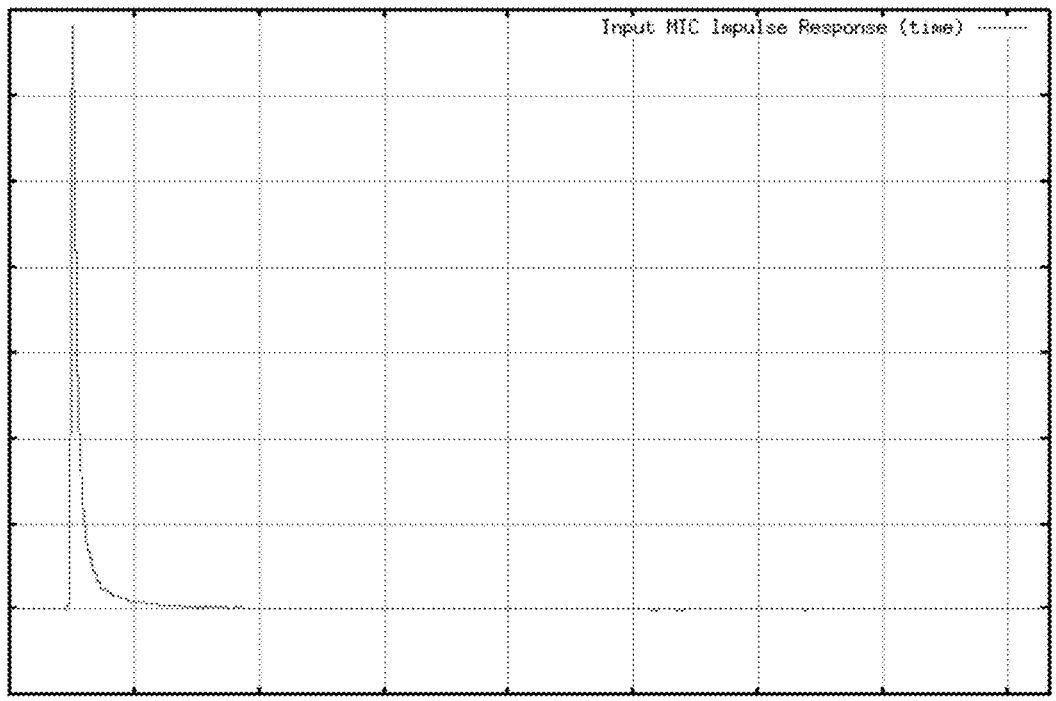
FIG. 4 shows the pulse response of the example channel used for the simulations herein.

In the following examples a 4-wire transmission line is used, with channel characteristics based on the reference channel provide by TE (www.te.com) for 2 wires on a back-plane channel measured for the IEEE 802.3bj standard (found online at www-dot-ieee802.org/3/100GCU/public/channel.html). That described channel response was expanded to a 4 wire channel with crosstalk removed between wires. The baud rate was fixed at 8 GBaud per second. A continuous-time linear equalizer (CTLE) with equalization range between 0 dB to 12 dB and a 3-tap filter at the transmitter were assumed, with equalizer settings optimized to obtain the best horizontal eye openings. The pulse response of the resulting channel is shown in FIG. 4.

Figure 12:
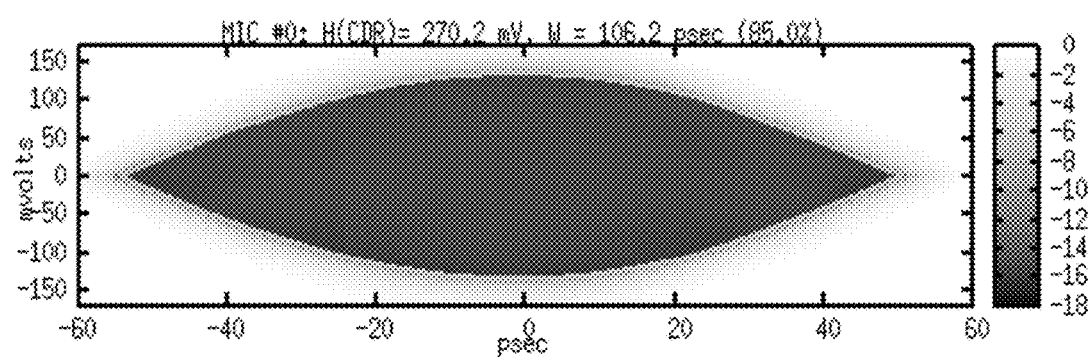
FIG. 12 shows an eye-diagram for NRZ as an example of common practice signaling methods on this channel.
Figure 13:
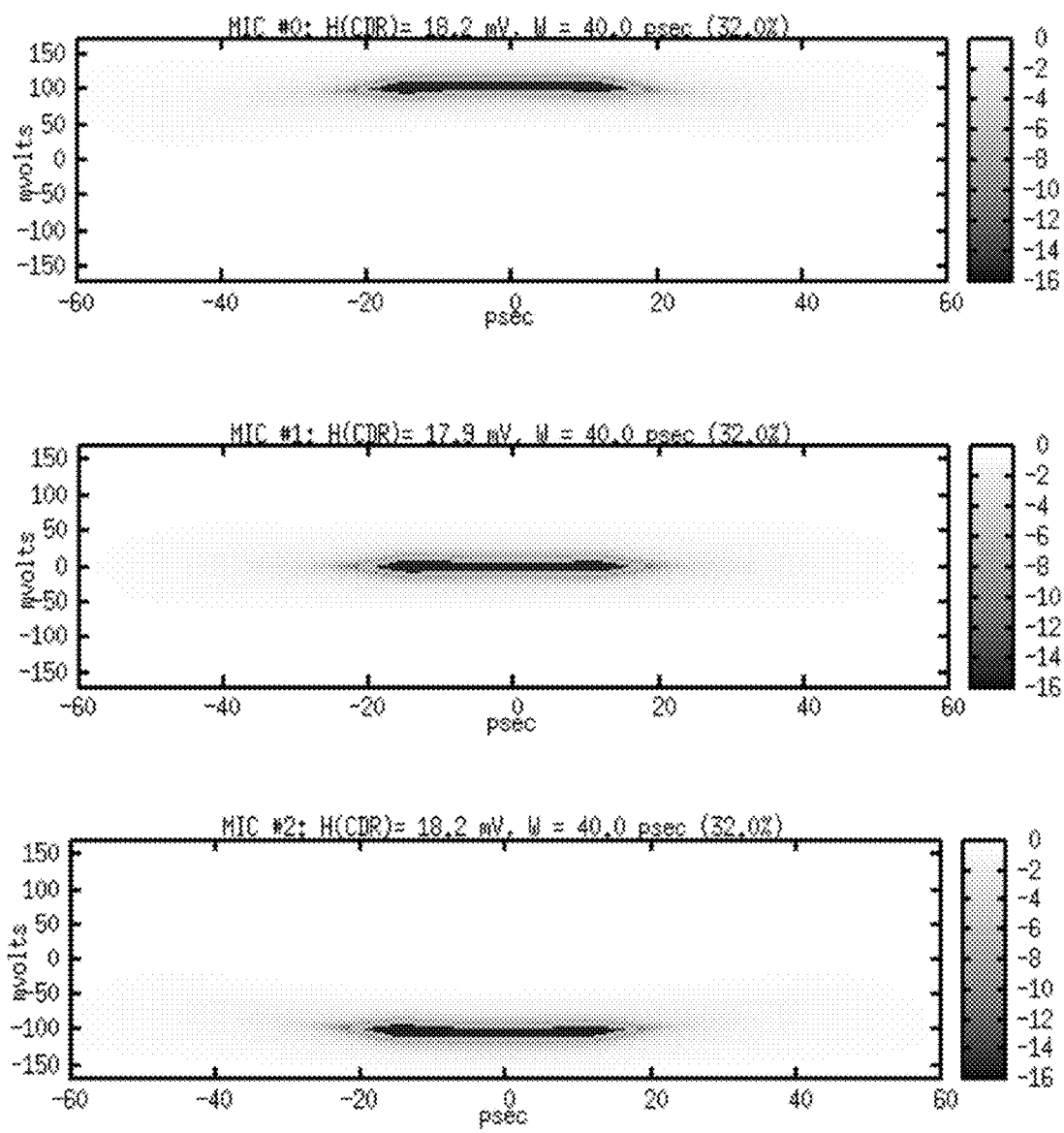
FIG. 13 shows the eye-diagrams for PAM-4 as an example of common practice signaling methods on this channel.

As examples of common practice signaling methods on this channel, FIG. 12 shows an eye-diagram for NRZ (throughput=4 Gbps/wire, horizontal opening=106.2 psec) and FIG. 13 shows the eye-diagrams for PAM-4 (throughput=8 Gbps/wire, horizontal opening=40.0 psec) signaling.

Figure 5:
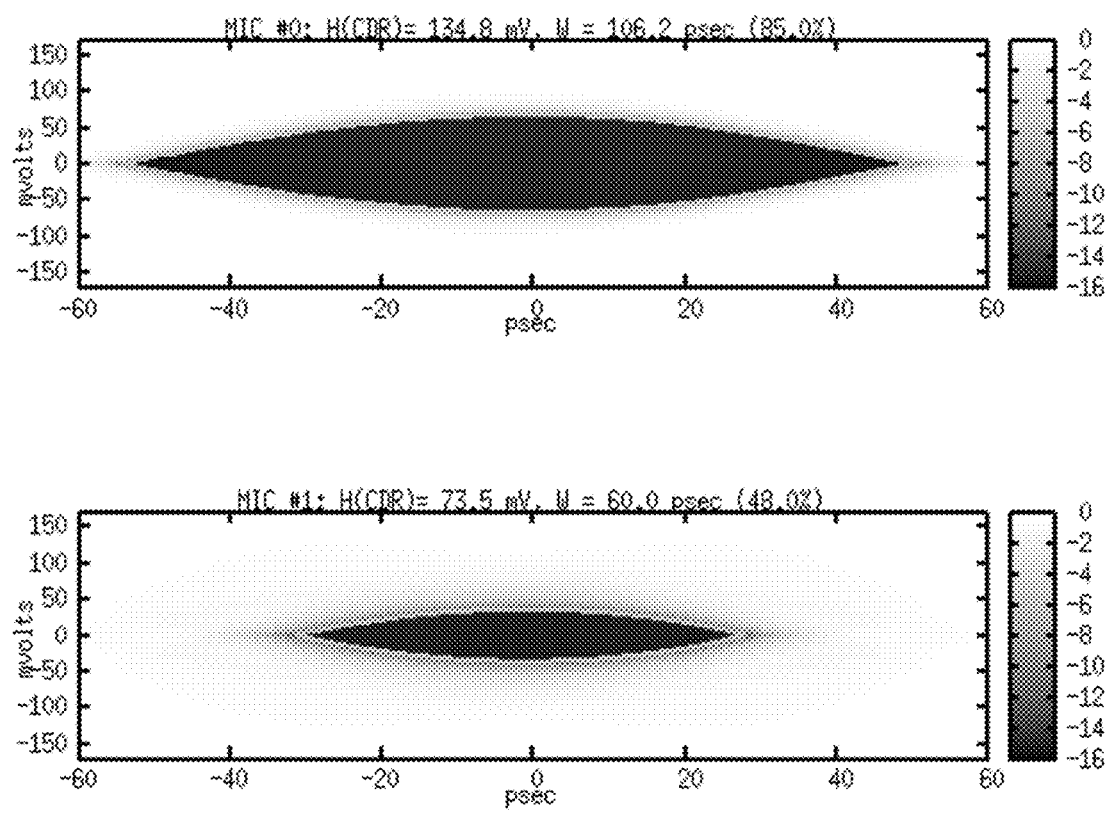
FIG. 5 shows eye diagrams for the first case MIC embodiment of a P3 receiver.

A first embodiment of a vector signaling code design is called P3 signaling, and uses 4 codewords (1, 0, −1), (−1, 0, 1), (0, 1, −1) and (0, −1, 1) to send 2 bits over 3 wires of the example channel. We consider the two following cases:

Case 1: We choose the MICs as (1, −1, 0) and (0, 1, −1). The outputs for the two MICs on the four codewords are the values 1, −1, −1, 1 and 1, −1, 2, −2, respectively. It is obvious from examination that the two MICs can distinguish the 4 codewords from each other. The ISI-Ratio for the first MIC is 1 (horizontal opening=106.2 psec) while the ISI-Ratio for the second MIC is 2 (horizontal opening=60 psec). The throughput is 5.33 Gbps/wire. The eye-diagrams are shown in FIG. 5.

Figure 6:
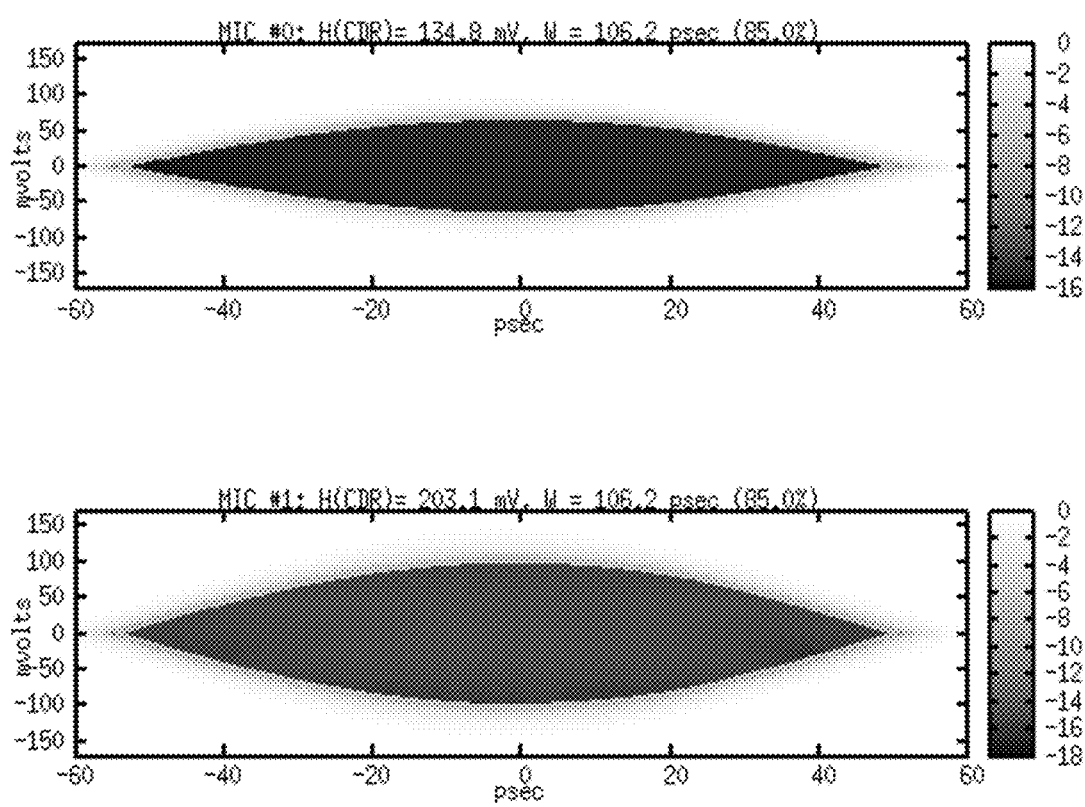
FIG. 6 shows eye diagrams for the second case MIC embodiment of a P3 receiver.
Figure 7A:
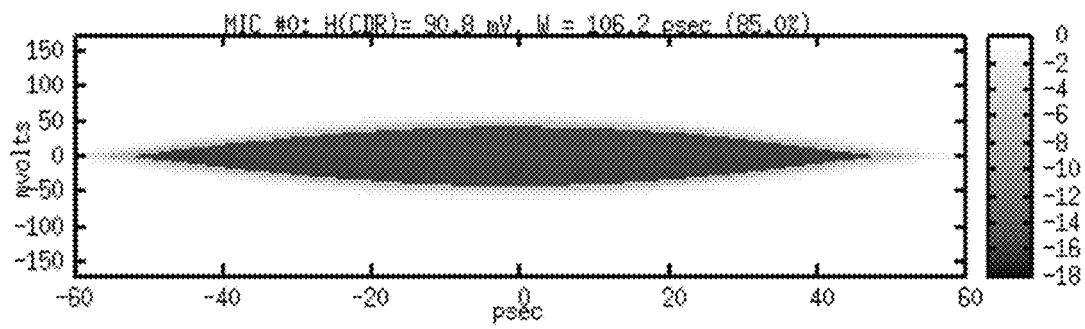
FIGS. 7A through 7E show eye diagrams for the five sub-channels of a 5b6w code receiver.
Figure 7B:
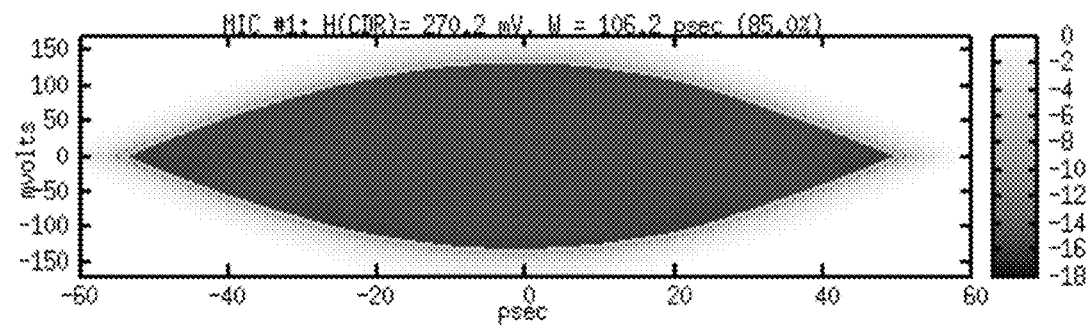
Figure 7C:
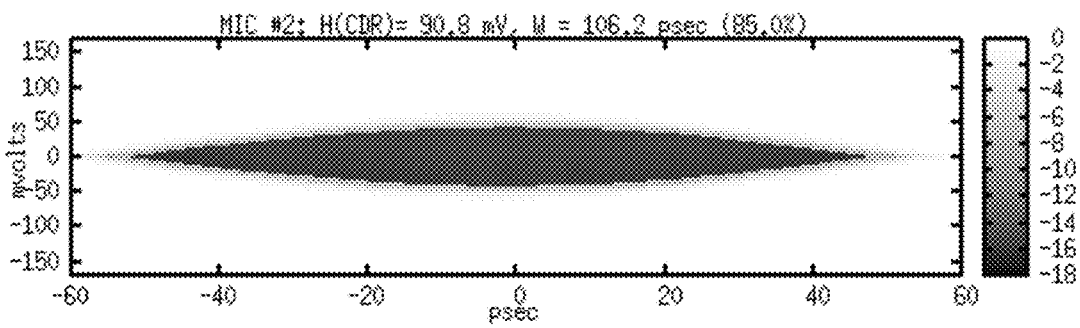
Figure 7D:
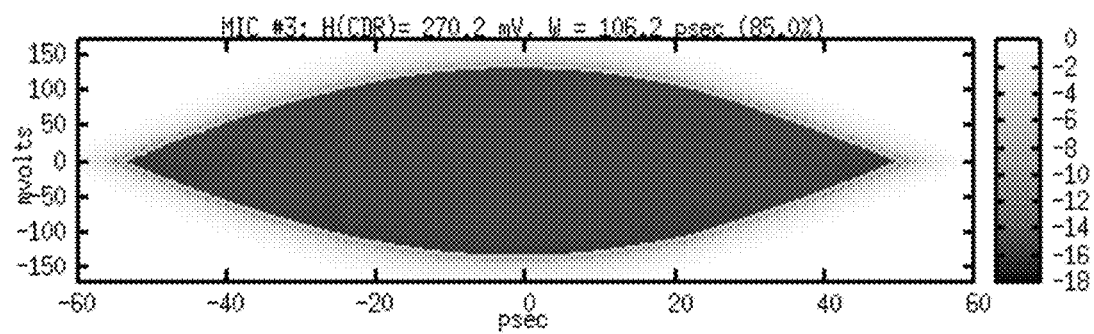
Figure 7E:
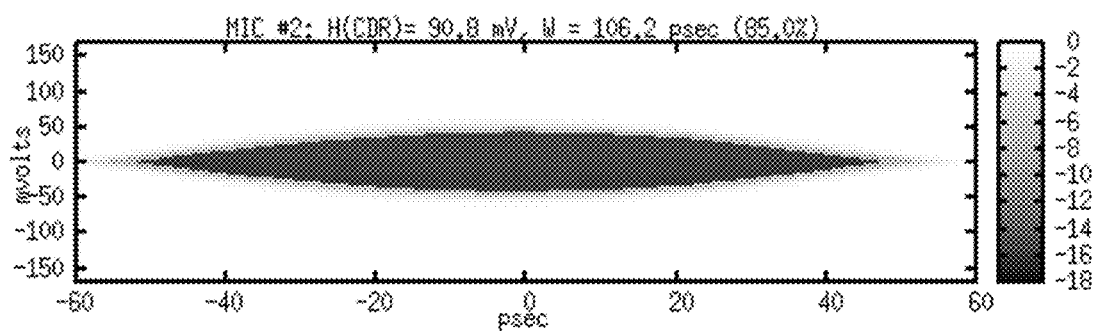

Case 2: We choose the MICs as (1, −1, 0) and (½, ½, −1). The outputs of the second MIC becomes 3/2, −3/2, 3/2, −3/2. The two MICs can still distinguish the codewords but the ISI_Ratio is 1 for both MIC's (horizontal opening=106.2 psec for both MICs). The throughput is 5.33 Gbps/wire. The eye-diagrams are shown in FIG. 6.

This example confirms that MICs with the same ISI-Ratio on the same channel under the same clock rate lead to approximately the same horizontal eye openings, and that the right choice of the MICs is crucial for the signal integrity of the transmission system.

A second embodiment of a signaling design utilizes linear coding; that is, the signaling scheme is defined by means of a matrix-vector product. The vector contains the bits to be transmitted and the matrix defines the transformation applied to the bits in order to generate the codewords. In this scheme, one can in principle send N−1 bits over N wires. The vector representing the bits is of the form (0, ±1, ±1, ..., ±1). The coding matrix has the first row as all ones and the other N−1 rows are orthogonal to first row and span the remaining (N−1)-dimensional subspace; thus, this is an orthogonal matrix as previously described herein. The MIC coefficients are found simply from the corresponding N−1 columns of the inverse of the coding matrix.

An interesting property of the linear coding scheme based on an orthogonal matrix is that the output of all the MICs are simply of the form ±1 and therefore the ISI-Ratio is guaranteed to be 1. As will be seen, this guarantee has a profound effect on communications system performance using such codes.

In a further embodiment, we can make use of the P3 code above and build the following Glasswing coding matrix to send 5 bits over 6 wires:

$$S \cdot A = w$$ [Eqn. 13]

$$\text{where } A = \begin{bmatrix} 1 & 1 & 1 & 1 & 1 & 1 \\ 1 & -1 & 0 & 0 & 0 & 0 \\ 1 & 1 & -2 & 0 & 0 & 0 \\ 0 & 0 & 0 & 1 & -1 & 0 \\ 0 & 0 & 0 & 1 & 1 & -2 \\ 1 & 1 & 1 & -1 & -1 & -1 \end{bmatrix}$$

and S=a row vector of information bits [0, $S_0$, $S_1$, $S_2$, $S_3$, $S_4$] representing antipodal weights (e.g., ±1 for logic bits 0, 1, or alternatively ±⅓), and w is the codeword vector to be transmitted [$w_0$, $w_1$, $w_2$, $w_3$, $w_4$, $w_5$]. If antipodal weights of ±1 are used, then the transmitted codewords may then be normalized by a factor of ⅓ to result in codewords having a quaternary alphabet of {±⅓, ±1}. Furthermore, because of the selection of the sub-channel code words of equation 13, the linear combinations of the sub-channel codes that form the codewords that are ultimately transmitted will provide a reduced alphabet of codeword elements. That is, at least one of the sub-channel code vectors has a non-normalized magnitude and wherein the row-wise linear combinations of the reduced-alphabet matrix provide a reduced alphabet. It may be observed that sub-channel code vectors having three non-zero elements comprise a first non-zero element twice as large as each of a second non-zero element and a third non-zero element, and a position of the first non-zero element is aligned to where only one other sub-channel codeword vector has a non-zero element.

The inverse matrix whose columns define the MIC coefficients is simply the transpose of the matrix A of Eqn. 13 with appropriate normalization, and was previously described as Eqn. 3. The throughput is 6.66 Gbps/wire. The eye-diagrams of this scheme are shown in FIG. 7A through FIG. 7E. The horizontal opening is 106.2 psec for all the MICs. The five bit over six wire or 5b6w code of Eqn. 13, MIC matrix of Eqn. 3, and codewords of Table 1 will herein be called the "Glasswing" code.

A third embodiment of a signaling design also utilizes linear coding and is called Ensemble-NRZ or ENRZ. A full description of ENRZ may be found in [Cronie I]. ENRZ has 8 codewords of the form ±perm(1, −⅓, −⅓, −⅓) where "perm" means all the permutations of the coefficients, and 3 MICs of the form (½, −½, ½, −½), (½, ½, −½, −½) and (½, −½, −½, ½), and can send 3 bits over 4 wires per unit interval. The coding matrix is a scaled version of the 4×4-Hadamard matrix:

$$A = \frac{1}{3}\begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad [\text{Eqn. 14}]$$

Figure 8A:
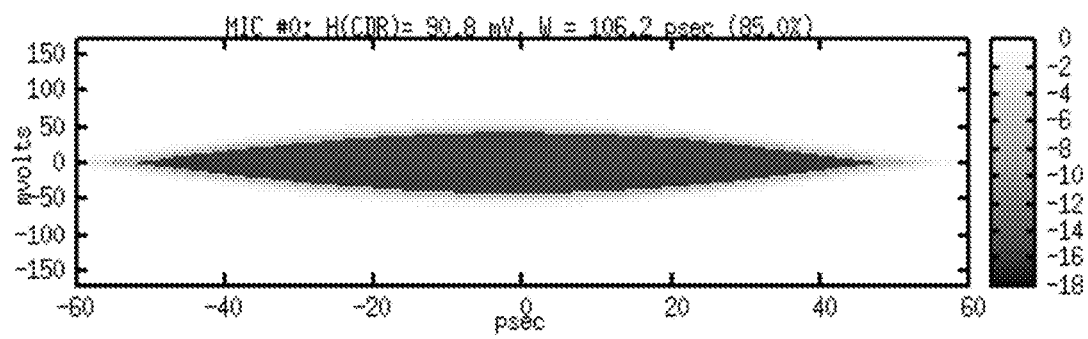
FIGS. 8A through 8C show eye diagrams for the three sub-channels of an ENRZ code receiver.
Figure 8B:
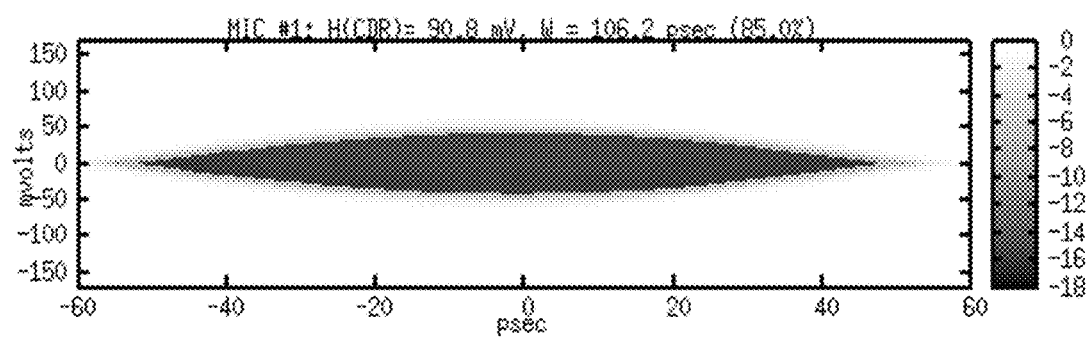
Figure 8C:
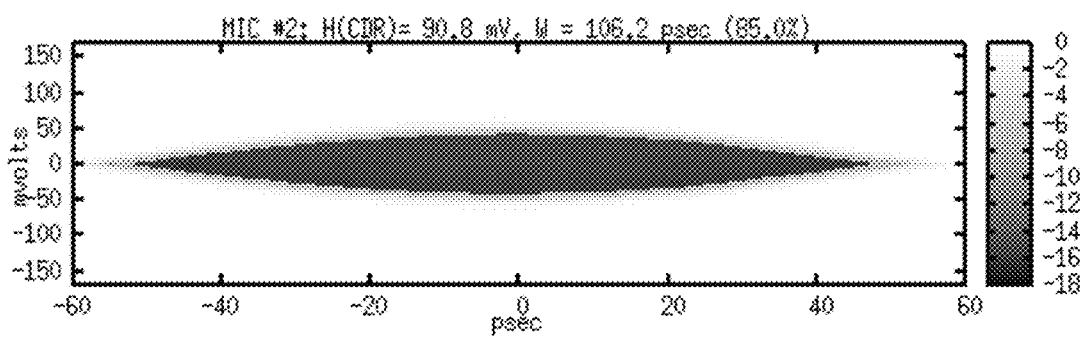

The scale factor ⅓ is chosen so that the final values are constrained to be between −1 and 1. The throughput is 6 Gbps/wire. The eye-diagrams for ENRZ signaling are shown in FIGS. 8A through 8C. The horizontal opening is 106.2 psec for the three MICs.

Figure 9A:
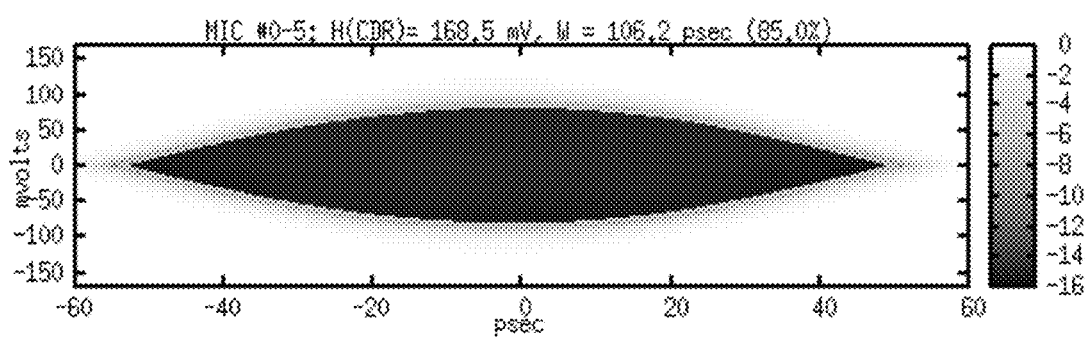
FIGS. 9A and 9B show eye diagrams for the 4.5b5w code of [Shokrollahi I].
Figure 9B:
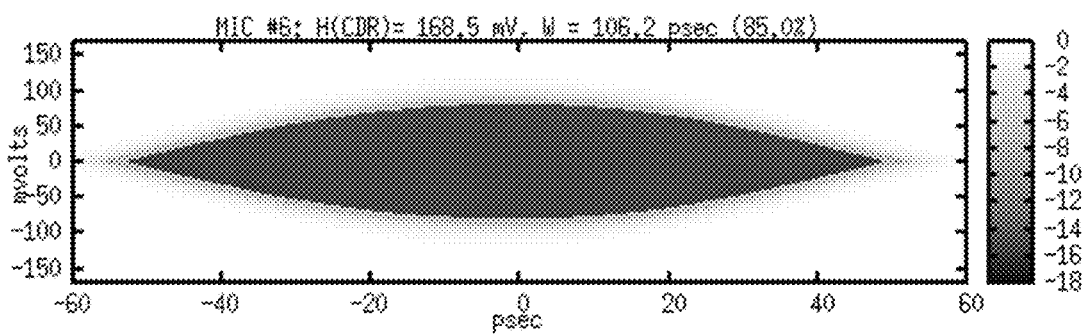

A fourth embodiment is a vector-signaling code design having the property of containing different MICs with different ISI-Ratios as well as non-active codewords for the MICs. This category of codes allows the designer to provide codes with fewer number of MICs compared to the codes with the same throughput and all ISI-Ratios equal. Moreover, as we see in the following examples, the MICs with smaller ISI-Ratio are generally ones that make the linear combination on more wires compared to the MICs with higher ISI-Ratios. Since these MICs provide more horizontal opening, this property makes these MICs more tolerant to higher skew when more wires are involved in the linear combination. An example of this design strategy is drawn from [Shokrollahi I], which describes a code having 24 codewords of the form ±(perm(1,1,0,−1)|−1) where "perm" means all the permutations of the coefficients. This code can send 4.5 bits over 5 wires in each unit interval. There are 7 MICs in this scheme, the first 6 are all the pairwise comparisons between the first four wires and all have ISI-Ratio 2. The last MIC has coefficients (¼, ¼, ¼, ¼, −1) and has ISI-Ratio 1. The throughput is 7.2 Gbps/wire. The eye-diagrams in s 9A and 9B show the wider horizontal opening of the last MIC (FIG. 9B, horizontal opening=106.2 psec) compared to the pairwise comparator MICs with higher ISI-Ratios (FIG. 9A, horizontal opening=62.5 psec).

Figure 10A:
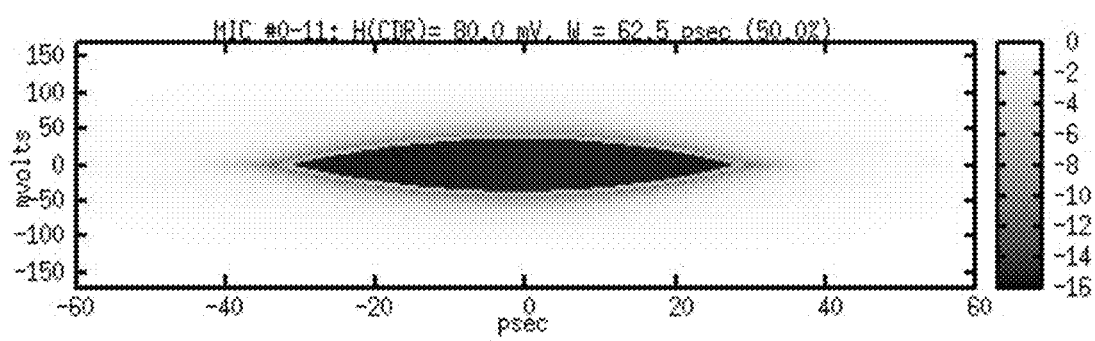
FIGS. 10A and 10B show eye diagrams for an 8b8w code.
Figure 10B:
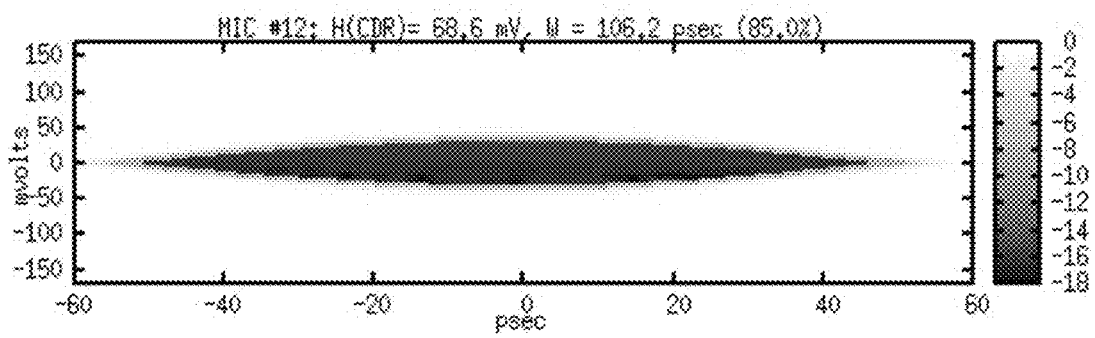

The final example embodiment is a code that sends 8 bits over 8 wires using 13 MICs. The codewords are of the form ±(perm(1,1,0,−1) perm(−1,−1,0,1)) where "perm" means all the permutations of the coefficients. The MIC's are 6 pairwise comparators on the first four wires, 6 pairwise comparators on the second four wires, and one MIC (1,1,1,1,−1,−1,−1,−1)/4. The last input MIC has ISI ratio of 1 while each of the pairwise comparator MICs has an ISI-Ratio of 2. The throughput is 8 Gbps/wire. The eye-diagrams are shown in FIGS. 10A and 10B. The MIC with ISI-Ratio 1 has horizontal opening of 106.2 psec (FIG. 10B) while the other MICs with ISI-Ratio 2 has horizontal opening of 62.5 psec (FIG. 10A).

To allow direct comparison of these embodiments, we calculate the horizontal eye openings for the previously described ENRZ, NRZ and PAM-4 signaling schemes and then plot the relationship of horizontal eye opening as a function of the throughput. The throughput values are normalized for comparison purposes, as the required baud rate to obtain the same throughput differ for each of these signaling schemes.

Figure 11:
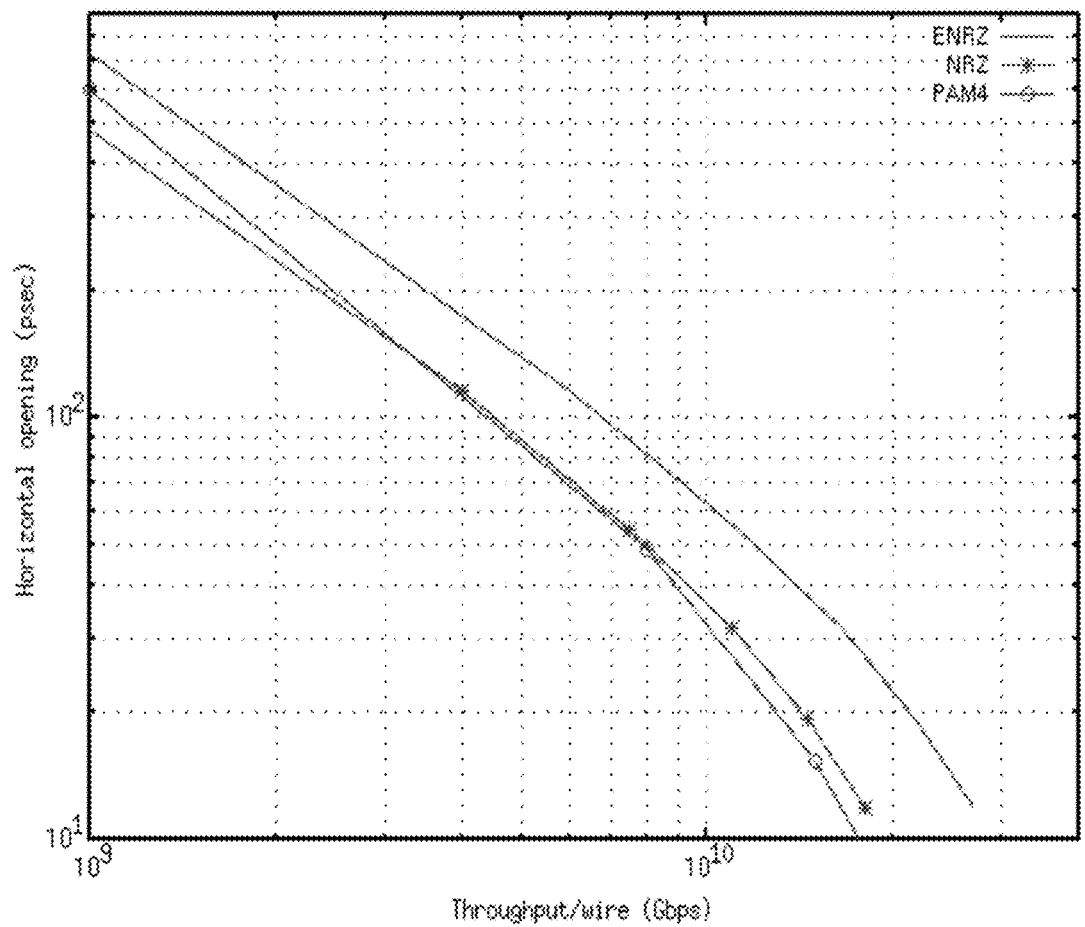
FIG. 11 is a graph comparing performance of NRZ, PAM-4, and ENRZ signaling over the same channel model.

The result is shown in the graph of FIG. 11. Comparing NRZ and ENRZ, the ISI-Ratio of both is equal to 1 while the baud rate of ENRZ is ⅔ that of NRZ. Comparing PAM4 and ENRZ, the baud rate of ENRZ is 4/3 of PAM4, but its ISI-Ratio is 3 times smaller. Thus, the embodiment having the lowest ISI-Ratio, ENRZ with its ISI-Ratio of 1, is the overall winner across the throughput range, illustrating that low ISI-Ratio is a predictor of good communications system performance.

Normalizing Sub-channel Gain

Performing a numerical analysis of the codes of Table 1 and the receiver defined by the matrix of Eqn. 3, it may be observed that comparators defined by matrix rows 1, 3, and 5 produce output values of ±⅔, whereas the comparators defined by matrix rows 2 and 4 produce output values of ±1. The loss in vertical eye opening compared to differential signaling is therefore $20*\log_{10}(3)=\sim 9.5$ dB. This output level variation is the result of our loosened definition of orthogonality for the receive matrix, as the non-unity values of the diagonal $M^T M = D$ represent non-unity gains for the corresponding sub-channels. As will be apparent to one familiar with the art, normalizing the matrix (i.e. scaling its elements such that the diagonal values are 1), will result in a system having constant unity gain across all sub-channels. However, such known normalization methods may lead to suboptimal embodiments as the large number of distinct normalized coefficient values, in many cases including irrational values, are difficult to embody in a practical system.

At least one embodiment retains the unnormalized matrix as exemplified by Eqn. 3 with its convenient-to-implement coefficient values, and instead compensates for the variation of sub-channel amplitude by modifying the input signal amplitudes modulating the various sub-channel. For example, a hypothetical system having eight sub-channels of unity gain and one sub-channel of 0.8 gain will ultimately be SNR limited by the latter output. Thus, increasing the last sub-channel's transmission input to {+1.2, −1.2} rather than {+1, −1} will bring up the corresponding channel output. Alternatively, decreasing all other sub-channel inputs to {+0.8, −0.8} will lower the corresponding channel outputs, such that all channels have equal output levels with less transmit power required.

This compensation technique is not without cost, however. As taught by [Shokrollahi IV], modifying the input vector in this manner leads to an increase in the alphabet size needed (and thus, the number of discrete signal levels the transmitter must generate) to communicate the codewords over the channel. [Shokrollahi IV] teaches numeric methods to select suitable modulation amplitudes that result in closer matching of sub-channel outputs with minimal expansion of the required alphabet size.

Figure 22:
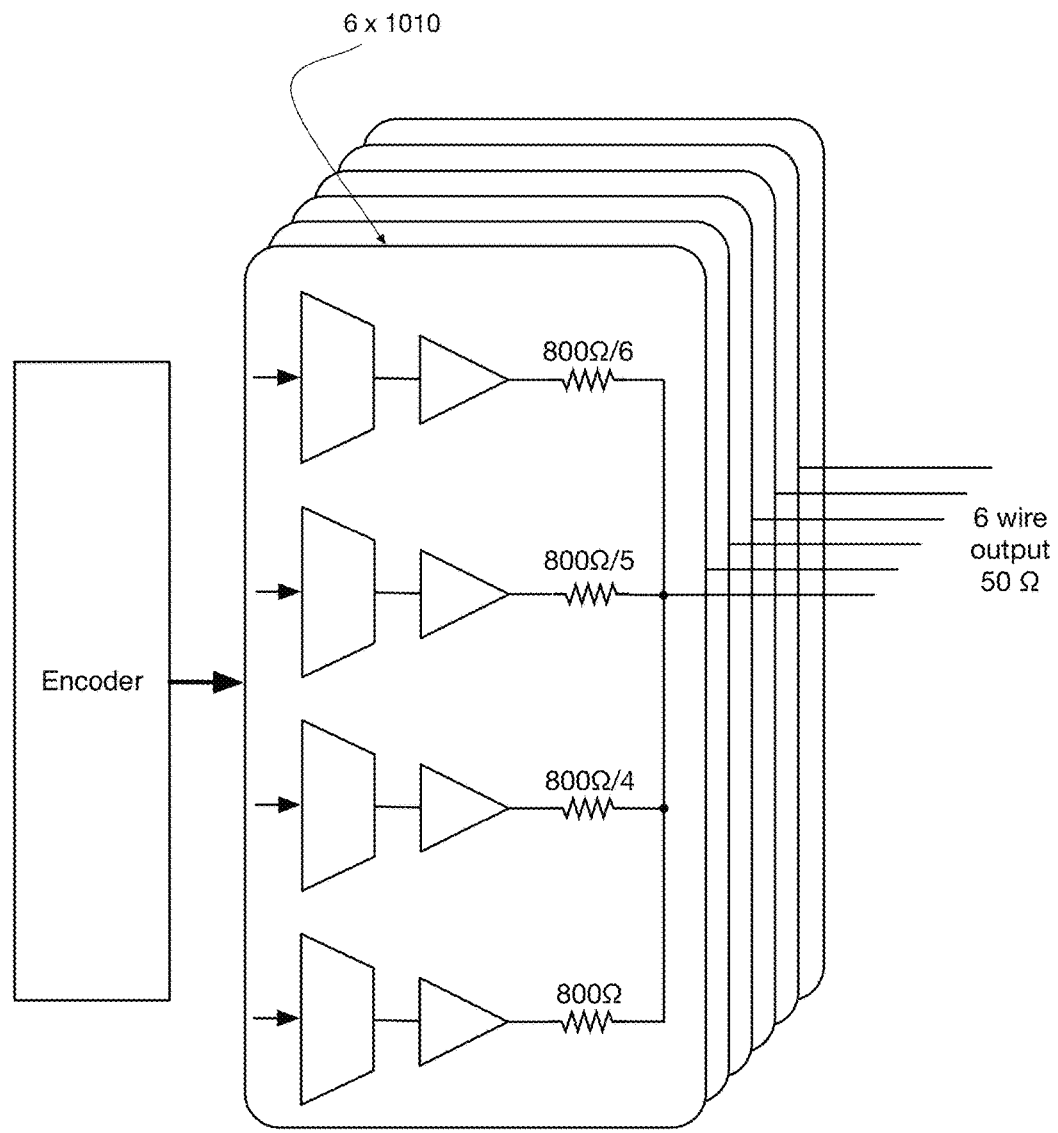
FIG. 22 is a block diagram of one embodiment of a Glasswing 5b6w_10_5 transmit driver.

Applying the procedure taught by [Shokrollahi IV], the optimal initial code set for Glasswing is calculated to be (0, ±⅜, ±¼, ±⅜, ±¼, ±⅜) with the corresponding code having an alphabet of size 10 given by (1, ⅞, ½, ¼, ⅛, −⅛, −¼, −½, −⅞, −1). The resulting codewords are shown in Table 2, with the new code herein called the 5b6w_10_5 code. One embodiment of a driver generating these signal levels is shown as FIG. 22. Each driver slice 1010 produces one wire output signal, with multiple driver elements on each slice being enabled in combination so as to produce the 10 distinct output levels required.

TABLE 2

| | |
|---|---|
| ±[1, ¼, +3¹¹/₈, ¼, +3¹¹/₂, +3¹⁷/₈] | ±[1, ¼, +3¹¹/₈, +3¹¹/₄, −1, ⅛] |
| ±[¼, 1, +3¹¹/₈, ¼, +3¹¹/₂, +3¹⁷/₈] | ±[¼, 1, +3¹¹/₈, +3¹¹/₄, −1, ⅛] |
| ±[½, +3¹¹/₄, ⅞, ¼, +3¹¹/₂, +3¹⁷/₈] | ±[½, +3¹¹/₄, ⅞, +3¹¹/₄, −1, ⅛] |
| ±[+3¹¹/₄, ½, ⅞, ¼, +3¹¹/₂, +3¹⁷/₈] | ±[+3¹¹/₄, ½, ⅞, +3¹¹/₄, −1, ⅛] |
| ±[1, ¼, +3¹¹/₈, +3¹¹/₂, ¼, +3¹⁷/₈] | ±[1, ¼, +3¹¹/₈, −1, +3¹¹/₄, ⅛] |
| ±[¼, 1, +3¹¹/₈, +3¹¹/₂, ¼, +3¹⁷/₈] | ±[¼, 1, +3¹¹/₈, −1, +3¹¹/₄, ⅛] |
| ±[½, +3¹¹/₄, ⅞, +3¹¹/₂, ¼, +3¹⁷/₈] | ±[½, +3¹¹/₄, ⅞, −1, +3¹¹/₄, ⅛] |
| ±[+3¹¹/₄, ½, ⅞, +3¹¹/₂, ¼, +3¹⁷/₈] | ±[+3¹¹/₄, ½, ⅞, −1, +3¹¹/₄, ⅛] |

With this code all comparators as in Eqn. 3 produce output values of +¾. The increase in vertical eye opening compared to the unmodified 5b6w code is $20*\log_{10}((3/4)/(2/3)) = \sim 1$ dB. The termination power of 5b6w_10_5 is about 88% of the termination power of the unmodified 5b6w code, so even at a smaller termination power, 5b6w_10_5 leads to a fractionally improved vertical eye opening. However, the implementation cost to obtain this improvement is the added complexity within the transmitter to encode data into an internal representation capable of selecting among ten rather than four symbol values per wire, and line drivers capable of generating ten discrete output levels rather than four. Such a transmitter embodiment would be fully compatible with any Glasswing receiver defined by the matrix of Eqn. 3, and would require less line driver power than an unmodified 5b6w transmit driver. Because of this generally disadvantageous cost/benefit tradeoff, most embodiments of Glasswing transmitters are expected to utilize unmodified 5b6w signal levels; where they are cost-effective, alternative embodiments incorporating the 5b6w_10_5 modifications may transparently be interchanged and/or interoperate with unmodified ones.

Basic Glasswing Receiver

Figure 14:
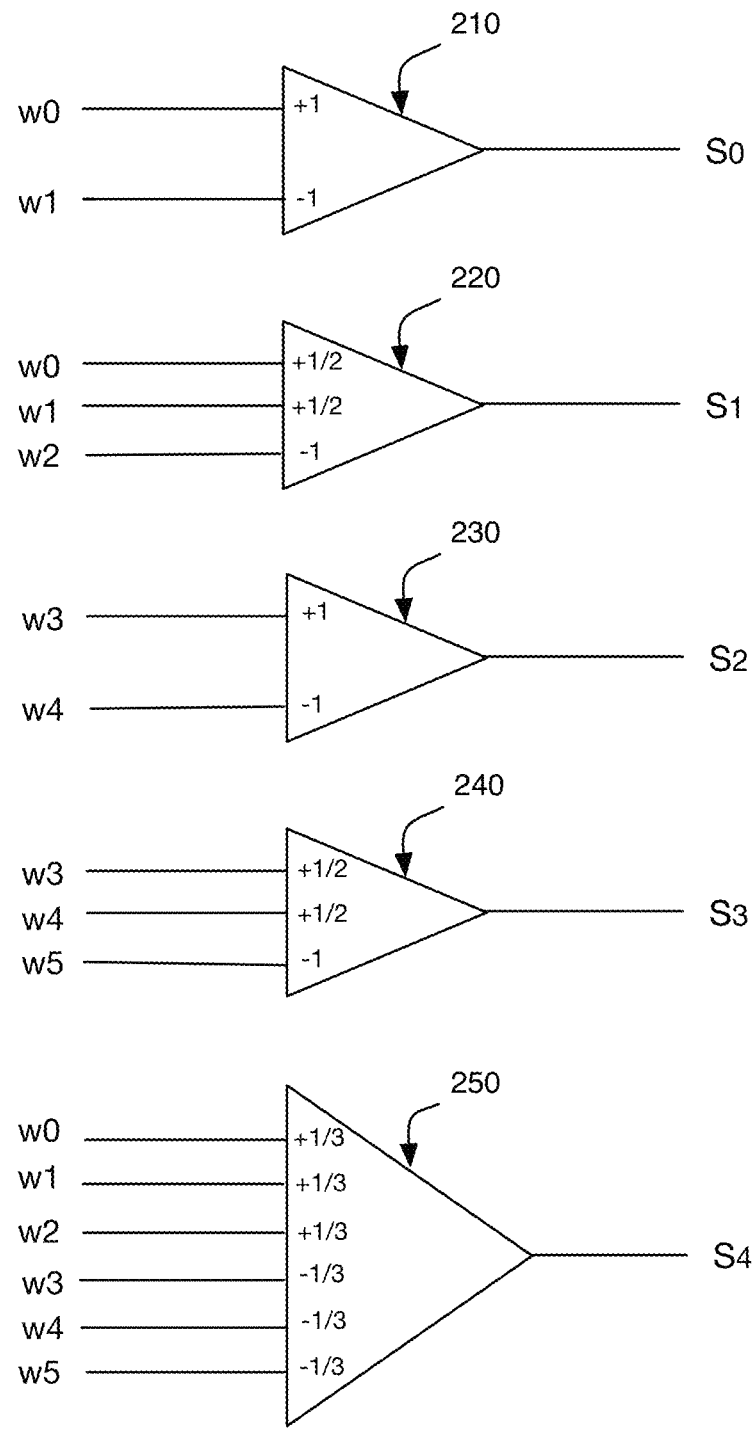
FIG. 14 is a block diagram of a Glasswing receiver.

An embodiment of the Glasswing receiver as defined by the matrix of Eqn. 3 is shown in FIG. 14. The six input wires are $w_0$ through $w_5$, and the five sub-channel outputs are $S_0$ through $S_5$. In the drawing convention used here, each of the inputs of the multiple-input comparators 210 through 250 is identified by a weight, representing the relative contribution of that input to the final result output, as defined by the matrix rows of Eqn. 3 defining each MIC. Thus, 210 and 230 may be seen to be conventional dual input differential comparators, each having one positive and one negative input of equal and opposite weight. Comparators 220 and 240 each have two positive inputs each contributing one half to the total positive value, and one input contributing the entire negative value. Comparator 250 has three inputs each contributing one third to the total positive value, and three inputs each contributing one third to the total negative value.

Embodiments of the five multi-input comparators corresponding to rows two through six of the matrix of Eqn. 3 may use the expanded differential pair design of [Holden I] or the alternative design of [Ulrich I]. In some embodiments, Continuous-Time Linear Equalization (CTLE) is also incorporated in the multi-wire comparator stage. Transistor-level schematics of such embodiments suitable for use with Glasswing are described in [Shokrollahi IV] and provided as examples herein as FIGS. 16 through 20. Each design is shown both with and without integrated CTLE and where applicable, alternative embodiments are illustrated.

Figure 16:
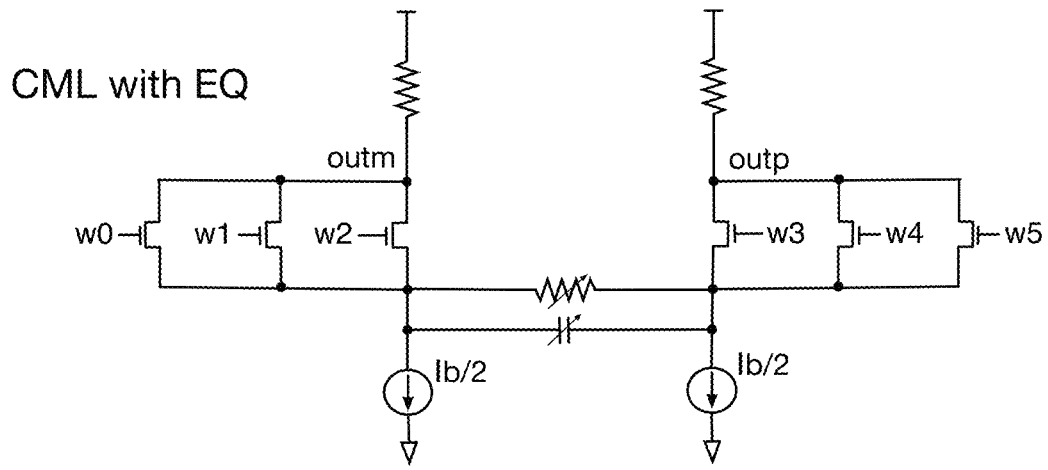
FIG. 16 is a schematic of one embodiment of a multi-input comparator with input weights as defined by row 6 of the matrix of Eqn. 3, both with and without equalization.
Figure 16:
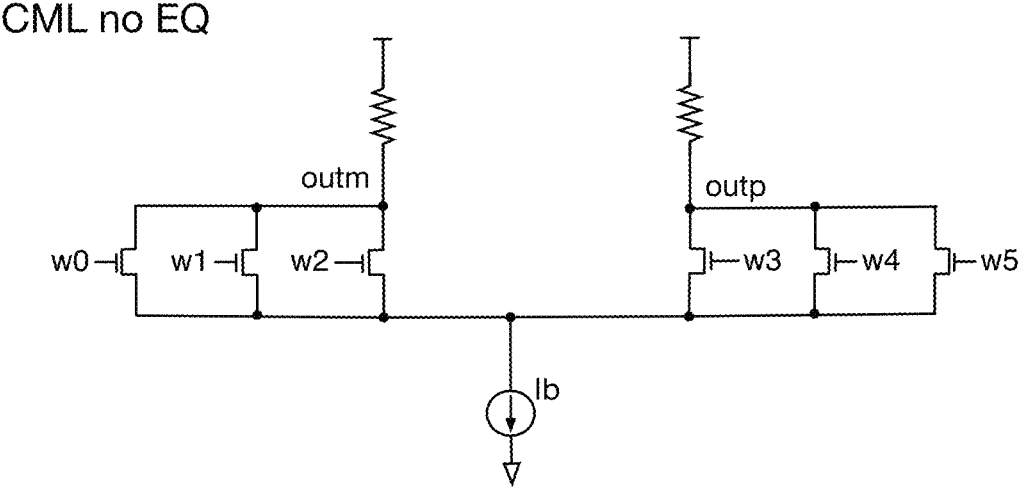
Figure 17:
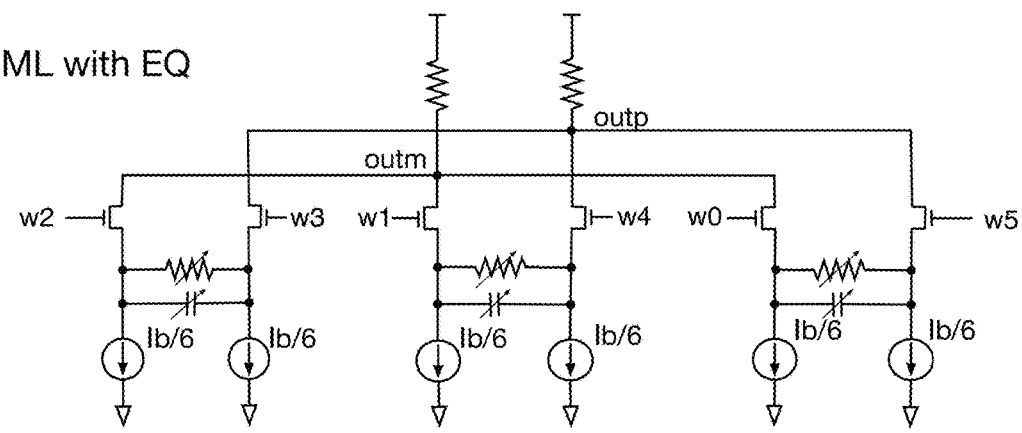
FIG. 17 is a schematic of one alterative one embodiment of a multi-input comparator with input weights as defined by row 6 of the matrix of Eqn. 3, both with and without equalization.
Figure 17:
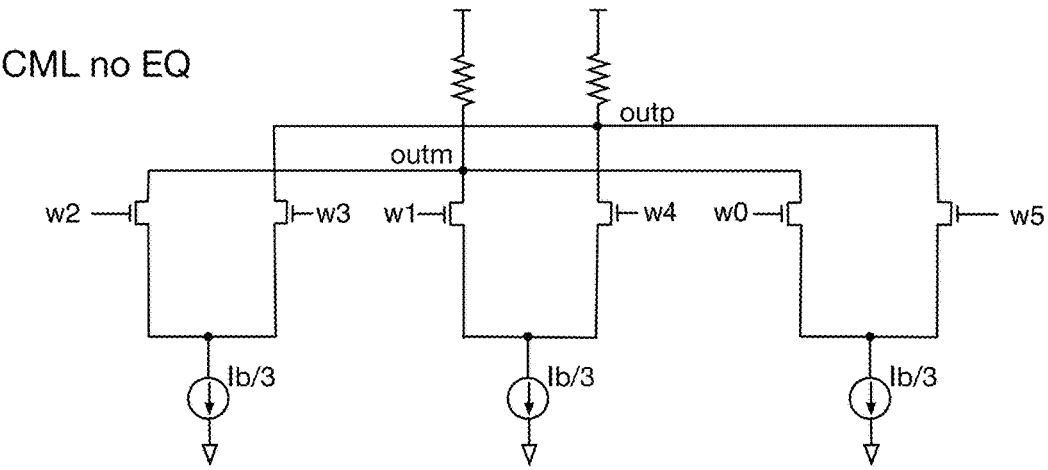
Figure 18:
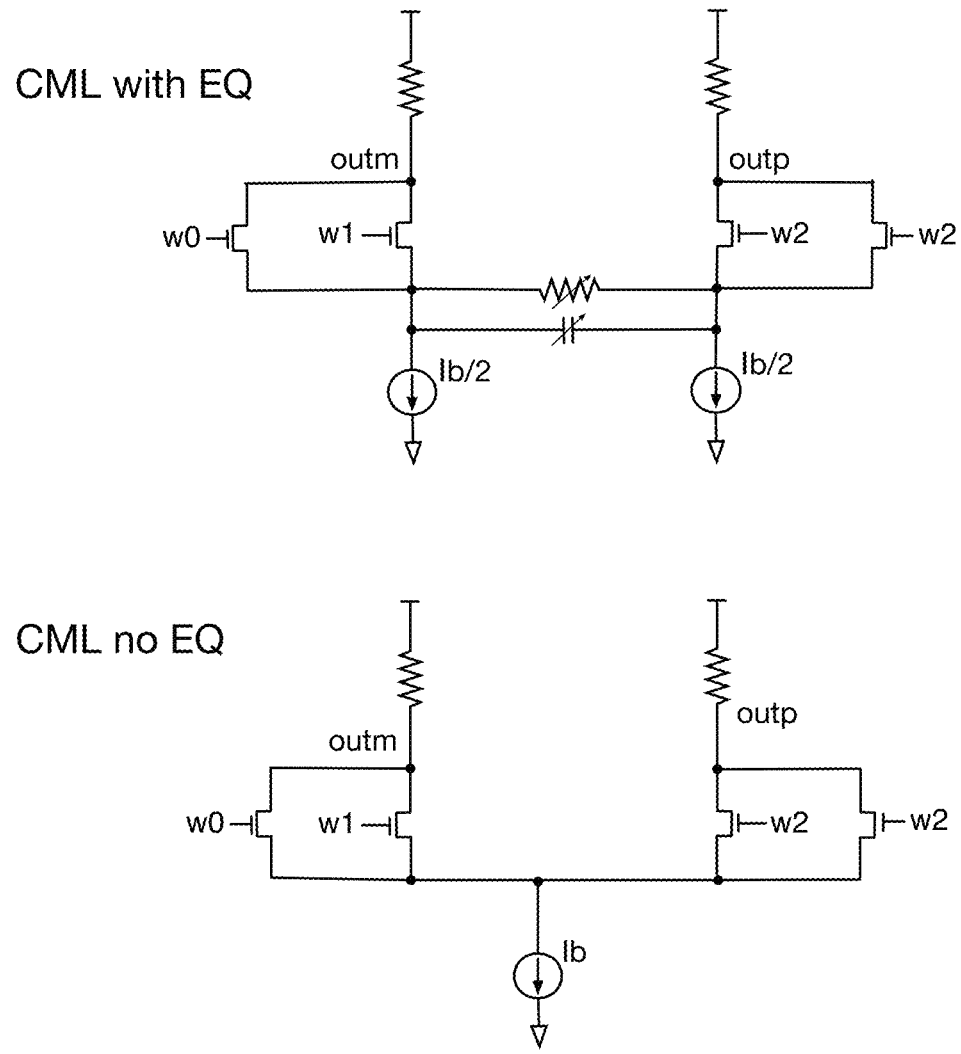
FIG. 18 is a schematic of one embodiment of a multi-input comparator with input weights as defined by row 3 of the matrix of Eqn. 3, both with and without equalization. With suitable substitution of wire inputs, it also may be used to embody the comparator of row 5 of the matrix of Eqn. 3.
Figure 19:
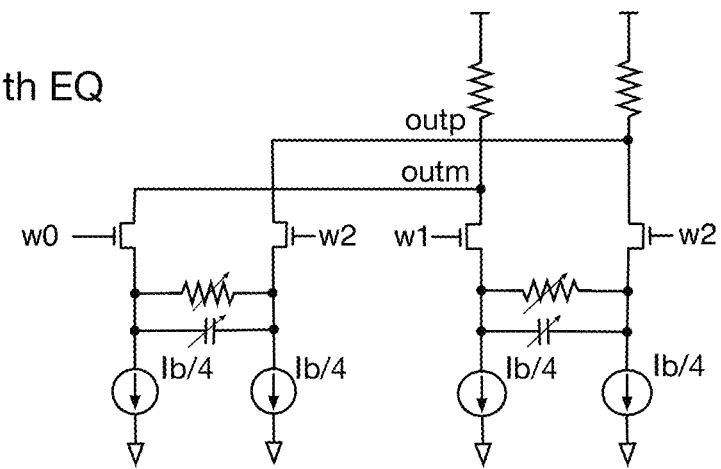
FIG. 19 is a schematic of one alterative embodiment of a multi-input comparator with input weights as defined by row 3 of the matrix of Eqn. 3, both with and without equalization. With suitable substitution of wire inputs, it also may be used to embody the comparator of row 5 of the matrix of Eqn. 3.
Figure 19:
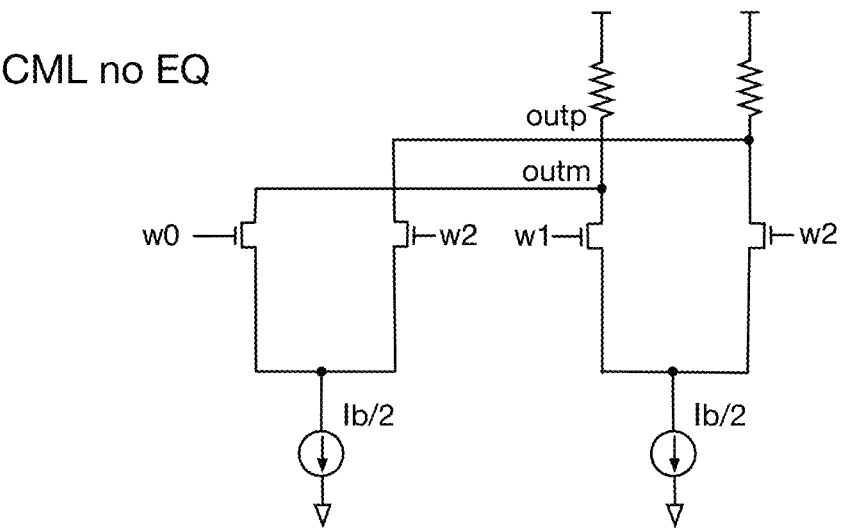
Figure 20:
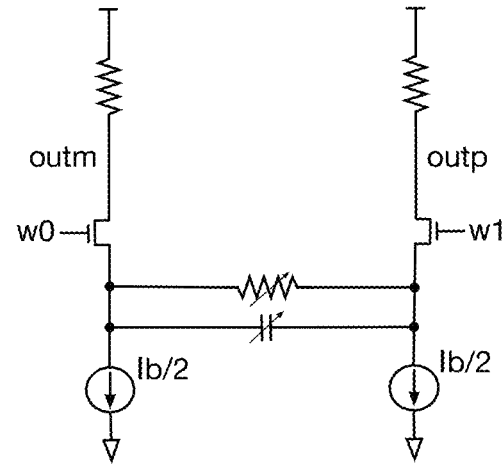
FIG. 20 is a schematic of one embodiment of a multi-input comparator with input weights as defined by row 2 of the matrix of Eqn. 3, both with and without equalization. With suitable substitution of wire inputs, it also may be used to embody the comparator of row 4 of the matrix of Eqn. 3.
Figure 20:
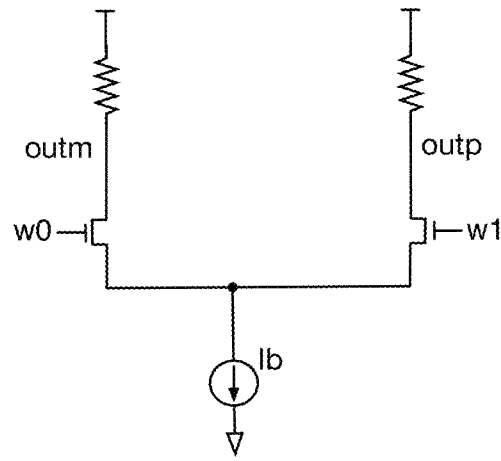

The embodiment of FIG. 16 or its alternative embodiment of FIG. 17 is suitable for use as comparator 250 of FIG. 14. The embodiment of FIG. 18 or its alternative embodiment of FIG. 19 is suitable for use as comparator 220, and with the obvious substitution of inputs w0, w1, and w2 with w3, w4, and w5, for use as comparator 240. The embodiment of FIG. 20 is suitable for use as comparator 210, and with the same substitution of inputs, for comparator 230.

In general, Decision Feedback Equalization (DFE) techniques are not required in a typical Glasswing embodiment, where the channel length is typically small and signal propagation characteristics good. No limitation is implied, however, as DFE and other known art methods may be combined in a straightforward manner with the described invention. In at least some such embodiments, DFE is performed not on the received wire signals, but instead on the sub-channels. In such configurations, the DFE history and correction computations may be performed on binary signal values, rather than on quaternary (for 5b6w) or decinary (for 5b6w_10_5) wire signals, as would be required where DFE is performed directly on wire signals.

Glasswing Transmitter

A variety of known art solutions may be applied to a Glasswing transmitter, depending on the specific characteristics of the communications channel and the process used for fabricating the semiconductor devices. Extremely short and/or moderate data rate Glasswing channels may utilize high impedance "CMOS-like" point-to-point interconnections, which are optimally driven using conventional voltage-mode drivers. Higher speed and/or longer channels having matched impedance terminations may preferably be driven using current-mode drivers.

It will be apparent to one skilled in the art that the required multilevel output drivers represent a specialized instance of Digital-to-Analog (D/A) conversion, a well-known field in the art. Thus, the corpus of known methods of D/A conversion, including those based on resistive chains, resistive ladders, summation of regulated voltages or currents, or selection among regulated voltages or currents, may be used in association with the present invention. Regulation may be to absolute values, such as a predetermined voltage or current, or may be relative or proportional to a provided level such as the integrated circuit supply voltage.

Figure 21:
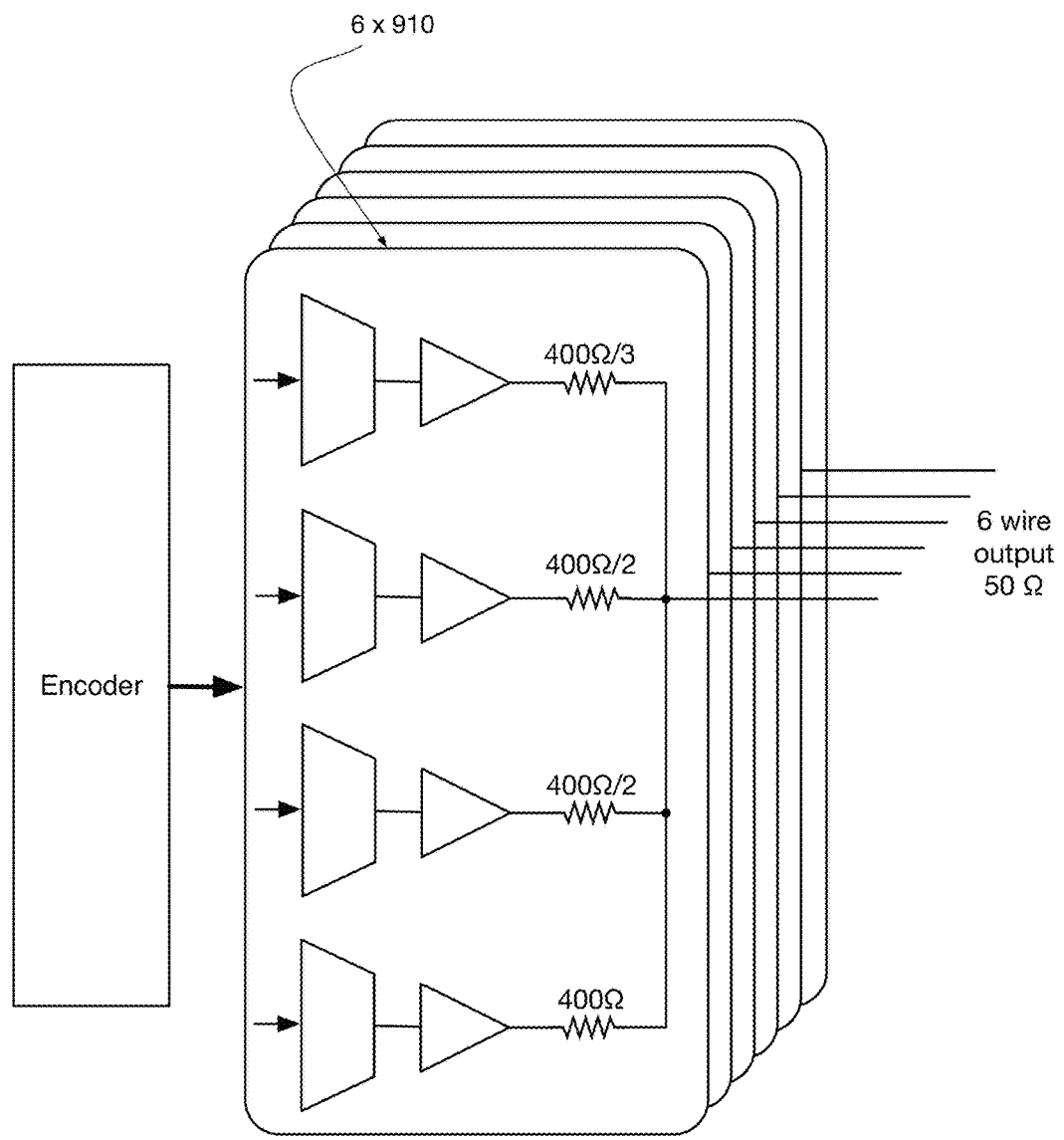
FIG. 21 is a block diagram of one embodiment of a Glasswing 5b6w transmit driver.

One embodiment of a resistive source terminated driver for a 5b6w transmitter using the teachings of [Ulrich III] is shown in FIG. 21. Each driver slice 910 produces one wire output signal, with multiple driver elements on each slice being enabled in combination so as to produce the four distinct output levels which must be generated by the transmitter, representing the codeword alphabet of +1, +⅓, −⅓, and −1 symbols. Thus, as will be obvious to one familiar with the art, the output of Encoder in FIG. 21 is comprised of at least two binary selector signals per driver slice 910, allowing selection of output values representing at least the alphabet of four symbols per wire. Larger alphabets may be utilized as previously described for optimization of Glasswing receive channel gain by utilizing modified modulation values, at the cost of additional transmitter complexity such as wider sets of selector signals between the Encoder and the wire drivers to enable selection of output values representing at least the larger alphabet set. One embodiment of a driver generating multiple signal levels is shown as FIG. 22.

Known transmission driver equalization techniques such as Finite Impulse Response filtering may be used in combination with Glasswing, as required by the particular channel characteristics and system design goals of the embodiment.

Figure 23:
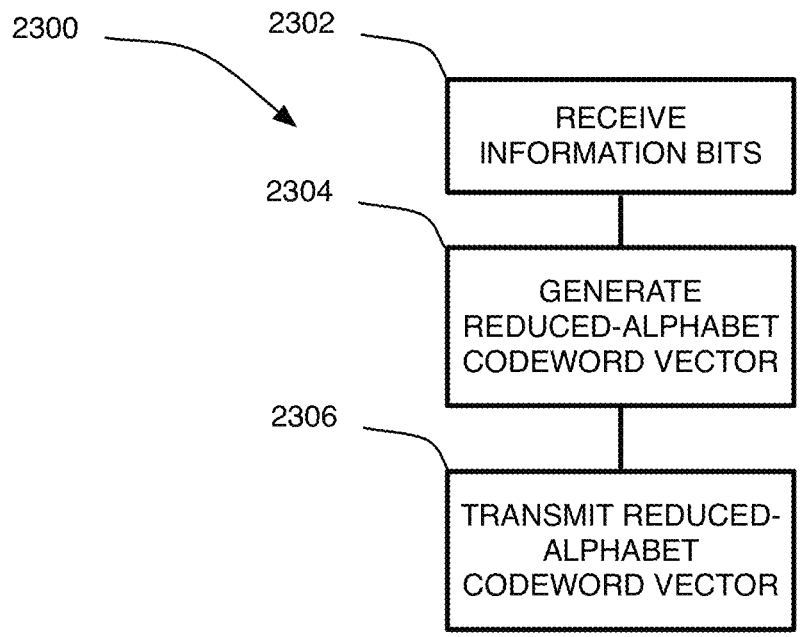
FIG. 23 is a flow diagram of a transmission method.

In one embodiment, a method 2300 is described with respect to FIG. 23. At block 2302 a set of information bits is received. At block 2304, a reduced-alphabet codeword vector is generated with an encoder. The encoder forms a weighted sum of sub-channel code vectors wherein a weighting of each sub-channel code vector is based in part on a corresponding antipodal weight determined by a corresponding information bit in the set of received bits. In various embodiments, the encoder is an orthogonal encoding logic circuit, and it generates a reduced-alphabet codeword vector by mapping the received set of information bits to a respective reduced-alphabet codeword vector and outputting a reduced-alphabet codeword vector selector signal. The selector signal may then be provided to the plurality of line drivers. Each line driver of the plurality of line drivers uses a portion of the reduced-alphabet codeword vector selector signal to output a corresponding current or voltage representing the reduced-alphabet codeword vector element. As described previously, the sub-channel code vectors form a reduced-alphabet weight matrix, and they are also are mutually orthogonal and orthogonal to a common mode vector.

At block 2306, the reduced-alphabet codeword vector is transmitted using a plurality of line drivers. In particular, the reduced-alphabet codeword vector comprises a plurality of reduced-alphabet codeword vector elements, and each reduced-alphabet codeword vector element is transmitted on a wire of a multi-wire communication bus by a respective one of the plurality of line drivers. In some embodiments, the reduced-alphabet codeword vector elements are selected from the normalized set of elements $\{+1, +\frac{1}{3}, -\frac{1}{3}, -1\}$.

The method 2300 may be used with a system having five sub-channel vectors, for use with a six-wire multi-wire communication bus. The antipodal weights are selected from the normalized set of elements $\{+1, -1\}$. Alternative methods may modulate an antipodal weight of at least one sub-channel according to a clock signal. Further, in some embodiments, a voltage offset may be modeled as including a constant weight applied to the common mode sub-channel vector.

Figure 24:
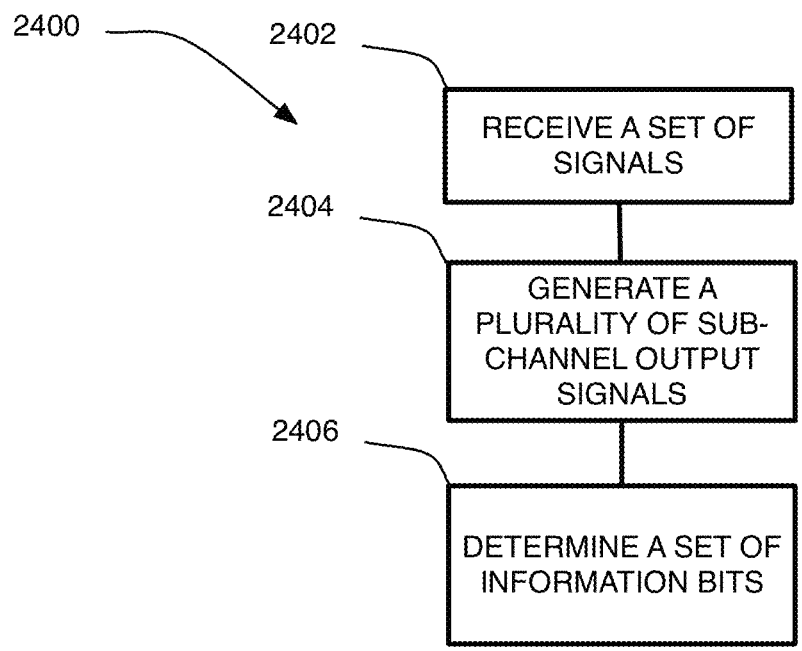
FIG. 24 is a flow diagram of a reception method.

A method 2400 will be described with respect to FIG. 24. At block 2402, a set of signals is received over a multi-wire communications bus. The set of signals represents a reduced-alphabet codeword vector formed from an antipodal-weighted sum of sub-channel code vectors. At block 2404 a plurality of sub-channel multi-input comparators generates a plurality of sub-channel output signals. Each multi-input comparator of the plurality of multi-input comparators implements an input weight vector corresponding to a sub-channel code vector, and outputs an antipodal output signal. At block 2406, a set of information bits is determined based on the respective antipodal output signals, such as by slicing the antipodal output signals with respect to a reference value. In one embodiment, the reduced-alphabet codeword vector elements are from the normalized set of elements $\{+1, +\frac{1}{3}, -\frac{1}{3}, -1\}$, and there are five sub-channel multi-input comparators, and the multi-wire communication bus comprises six wires.

Glasswing with Embedded Clock

Figure 15:
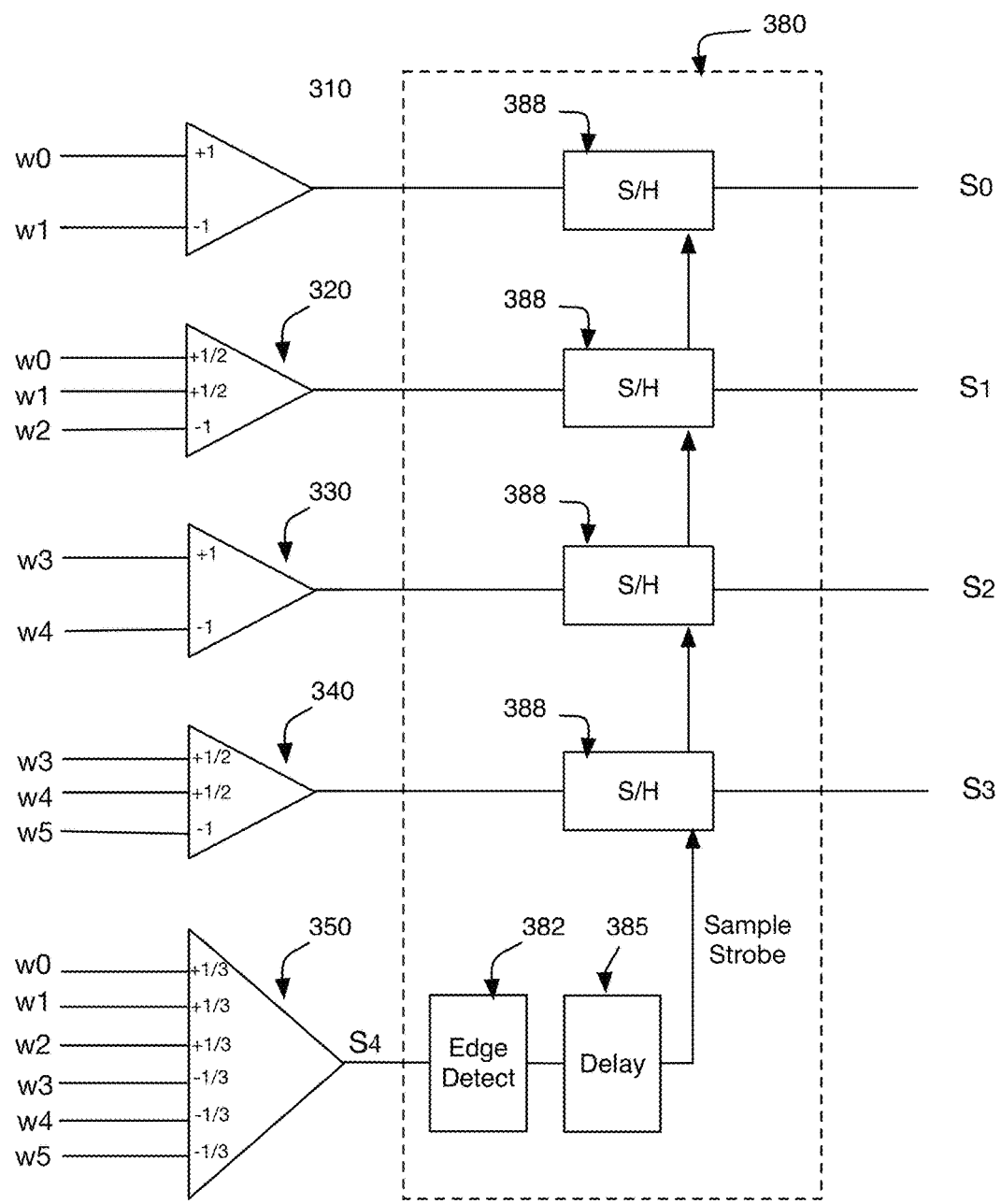
FIG. 15 is a block diagram of a Glasswing receiver recovering an embedded clock.

The embodiment of FIG. 15 utilizes the basic Glasswing receiver of FIG. 14, further incorporating an embedded clock signal carried by one sub-channel. Typically, when embedding a clock in a sub-channel, the highest-amplitude channel is chosen to carry the clock, as taught by [Shokrollahi III]. As a general design practice, this choice generally results in the clock channel having the best SNR, and thus the cleanest output results.

However, with the modest gain variations seen across the various Glasswing channels in actual embodiments, there is no significant practical motivation to select a particular sub-channel for the clock based on that criterion. In the embodiment of FIG. 15, the sub-channel defined by the bottom row of the matrix of Eqn. 3 is designated to carry the clock, as its symmetry and delay characteristics in a practical embodiment were found to be conducive to integration with the delay-and-sample behavior of conventional clock/data recovery circuits. One example of such a circuit is shown as 380, being comprised of clock edge detector 382; a fixed, adjustable, or DLL-controlled time delay 385, and sample-and-hold or equivalent data samplers 388.

Embodiments

In one embodiment, a method comprises: receiving a set of information bits; generating a reduced-alphabet codeword vector with an encoder by forming a weighted sum of sub-channel code vectors wherein a weighting of each sub-channel code vector is based in part on a corresponding antipodal weight determined by a corresponding information bit in the set of received bits, and wherein the sub-channel code vectors form a reduced-alphabet weight matrix, and are mutually orthogonal and orthogonal to a common mode vector; and, transmitting the reduced-alphabet codeword vector using a plurality of line drivers, wherein the reduced-alphabet codeword vector comprises a plurality of reduced-alphabet codeword vector elements, and each reduced-alphabet codeword vector element is transmitted on a wire of a multi-wire communication bus by a respective one of the plurality of line drivers.

In one embodiment, the encoder is an orthogonal encoding logic circuit, and generating a reduced-alphabet codeword vector comprises mapping the received set of information bits to a respective reduced-alphabet codeword vector and outputting a reduced-alphabet codeword vector selector signal.

In one embodiment, the reduced-alphabet codeword vector selector signal is provided to the plurality of line drivers, and wherein each line driver of the plurality of line drivers uses a portion of the reduced-alphabet codeword vector selector signal to output a corresponding a current or voltage representing the reduced-alphabet codeword vector element.

In one embodiment, at least one of the sub-channel code vectors has a non-normalized magnitude and wherein the row-wise linear combinations of the reduced-alphabet provide a reduced alphabet.

In one embodiment, the reduced-alphabet codeword vector elements are selected from the normalized set of elements $\{+1, +\frac{1}{3}, -\frac{1}{3}, -1\}$. There are five sub-channel vectors, and the multi-wire communication bus comprises six wires.

In one embodiment, the antipodal weights are selected from the normalized set of elements $\{+1, -1\}$. In one embodiment, an antipodal weight of at least one sub-channel is modulated according to a clock signal.

In one embodiment, a non-modulated common mode sub-channel vector is included to provide a voltage offset.

In one embodiment, sub-channel code vectors having three non-zero elements comprise a first non-zero element twice as large as each of a second non-zero element and a third non-zero element, and a position of the first non-zero element is aligned to where only one other sub-channel codeword vector has a non-zero element.

In one embodiment, a method comprises: receiving a set of signals over a multi-wire communications bus, the set of signals representing a reduced-alphabet codeword vector formed from an antipodal-weighted sum of sub-channel code vectors; generating a plurality of sub-channel output signals using a plurality of sub-channel multi-input comparators, each multi-input comparator of the plurality of multi-input comparators implementing an input weight vector corresponding to a sub-channel code vector, and outputting an antipodal output signal; determining a set of information bits from the respective antipodal output signals.

In one embodiment, the method may determine the set of information bits is done using a plurality of signal slicers. In one embodiment, the reduced-alphabet codeword vector elements are from the normalized set of elements $\{+1, +\frac{1}{3}, -\frac{1}{3}, -1\}$, and there are five sub-channel multi-input comparators, and the multi-wire communication bus comprises six wires.

In one embodiment, an apparatus comprises: a plurality of signal conductors for receiving a set of information bits; an encoder connected to the signal conductors for generating a reduced-alphabet codeword vector by forming a sum of sub-channel code vectors wherein a weighting of each sub-channel code vector is based in part on a corresponding antipodal weight determined by a corresponding information bit in the set of received bits, and wherein the sub-channel code vectors form a reduced-alphabet weight matrix, and are mutually orthogonal and orthogonal to a common mode vector; and a plurality of line drivers for transmitting the reduced alphabet codeword vector, wherein the reduced-alphabet codeword vector comprises a plurality of reduced-alphabet codeword vector elements, and each reduced-alphabet codeword vector element is transmitted on a wire of a multi-wire communication bus by a respective one of the plurality of line drivers.

In one embodiment, the encoder further comprises a logic circuit that maps the received set of information bits to a respective reduced-alphabet codeword vector and outputs a reduced-alphabet codeword vector selector signal.

In one embodiment, the apparatus includes wire connections for providing the reduced-alphabet codeword vector selector signal to the plurality of line drivers, wherein each line driver of the plurality of line drivers uses a portion of the reduced-alphabet codeword vector selector signal to output a corresponding a current or voltage representing the reduced-alphabet codeword vector element.

In one embodiment, the encoder is configured to produce a reduced-alphabet comprising a set of elements $\{+1, +\frac{1}{3}, -\frac{1}{3}, -1\}$. The multi-wire communications bus comprises six wires to transmit a set of five sub-channel code vectors. In one embodiment, the encoder is configured to select the antipodal weights from a set of elements $\{+1,-1\}$.

The encoder is configured to modulate at least one sub-channel code vector according to a clock signal. The encoder is configured to provide a voltage offset by providing a non-modulated common mode sub-channel vector.

In one embodiment, an apparatus comprises: a multi-wire communications bus configured to receive a set of signals, the set of signals representing a reduced-alphabet codeword vector formed from an antipodal-weighted sum of sub-channel code vectors; a plurality of sub-channel multi-input comparators, each multi-input comparator of the plurality of multi-input comparators implementing an input weight vector corresponding to a sub-channel code vector, and outputting an antipodal output signal; a plurality of signal slicers configured to determine a set of information bits from the respective antipodal output signals.

In one embodiment, the apparatus may receive a reduced-alphabet codeword vector elements selected from the normalized set of elements $\{+1, +\frac{1}{3}, -\frac{1}{3}, -1\}$, and there are five sub-channel multi-input comparators, and the multi-wire communication bus comprises six wires.

In a further embodiment, a diagnostic tool is provided using a method comprising: receiving a plurality of candidate codewords; calculating a ratio for each of a plurality of multi-input comparators, of the maximum distance of an active codeword to a multi-input comparator hyperplane passing through the origin and the minimum distance of an active codeword to the multi-input comparator hyperplane passing through the origin; and exporting the ratio for each central multi-input comparator for analysis. Furthermore, the hyperplane may contain an offset and is shifted, and the ratio is the maximum distance of an active codeword to the shifted hyperplane to the minimum distance of an active codeword to the shifted hyperplane.

The examples presented herein illustrate the use of vector signaling codes for point-to-point wire communications. For purposes of explanation, interconnection between a first transmitting device and a second receiving device have been described as unidirectional signaling networks. However, this should not been seen in any way as limiting the scope of the described invention. The methods disclosed in this application are equally applicable to networks capable of alternating signaling direction (i.e. half duplex), or of providing simultaneous communication between separate transmitters and receivers in both directions (i.e. full duplex.) Similarly, more than one instance of the described invention may be used essentially in parallel to communicate wider data words and/or provide higher overall communication bandwidth, with individual instances having individual embedded clocks, or two or more instances sharing a common clock. Other communication media including optical and wireless communications may similarly be used rather than the described wire interconnections. Thus, descriptive terms herein such as "voltage" or "signal level" should be considered to include equivalents in other measurement systems, such as "optical intensity", "RF modulation", etc. As used herein, the term "physical signal" includes any suitable behavior and/or attribute of a physical phenomenon capable of conveying information. Physical signals may be tangible and non-transitory.

We claim:
1. A method comprising:
receiving a set of input signals;
generating symbols of a normalized-gain codeword based on a weighted sum of a set of subchannels, each subchannel weighted with a corresponding input signal, wherein the set of subchannels correspond to rows of a set of rows selected from a normalized orthogonal matrix, each row of the set of rows (i) mutually orthogonal and (ii) orthogonal to an all-one row, wherein a first number of symbols of the normalized-gain codeword affected by a first subchannel is different from a second number of symbols of the normalized-gain codeword affected by a second subchannel, the first and second subchannels having equal subchannel gain; and
transmitting the symbols of the normalized-gain codeword on a plurality of wires of a multi-wire bus, each symbol of the normalized-gain codeword transmitted via a respective wire of the plurality of wires of the multi-wire bus.

2. The method of claim 1, wherein the normalized orthogonal matrix is represented by the matrix:

$$\begin{pmatrix} 1 & 1 & 1 & 1 & 1 & 1 \\ \frac{3}{8} & -\frac{3}{8} & 0 & 0 & 0 & 0 \\ \frac{1}{4} & \frac{1}{4} & -\frac{1}{2} & 0 & 0 & 0 \\ 0 & 0 & 0 & \frac{3}{8} & -\frac{3}{8} & 0 \\ 0 & 0 & 0 & \frac{1}{4} & \frac{1}{4} & -\frac{1}{2} \\ \frac{3}{8} & \frac{3}{8} & \frac{3}{8} & -\frac{3}{8} & -\frac{3}{8} & -\frac{3}{8} \end{pmatrix}$$

3. The method of claim 1, wherein the normalized orthogonal matrix is generated from an unnormalized matrix, and wherein generating the normalized matrix comprises:
generating a normalized set of signals by adjusting signal levels of the received input signals, and weighting subchannels of the unnormalized matrix with corresponding signals of the normalized set of signals.

4. The method of claim 3, wherein the unnormalized matrix is represented by the matrix:

$$\begin{pmatrix} 1 & 1 & 1 & 1 & 1 & 1 \\ 1 & -1 & 0 & 0 & 0 & 0 \\ 1 & 1 & -2 & 0 & 0 & 0 \\ 0 & 0 & 0 & 1 & -1 & 0 \\ 0 & 0 & 0 & 1 & 1 & -2 \\ 1 & 1 & 1 & -1 & -1 & -1 \end{pmatrix}$$

5. The method of claim 3, wherein adjusting the signal levels of input signals comprises adjusting signal levels of lower-magnitude signals to a magnitude of a highest-magnitude signal of the set of input signals.

6. The method of claim 3, wherein adjusting the signal levels of input signals comprises adjusting signal levels of higher-magnitude signals to a magnitude of a lower-magnitude signal of the set of input signals.

7. The method of claim 1, further comprising:
receiving the symbols of the normalized-gain codeword via the multi-wire bus;
generating a set of comparator outputs, using a set of multi-input comparators (MICs), each comparator output generated based on a respective combination of a respective subset of symbols of the normalized-gain codeword according to a respective set of input-weighting coefficients, and wherein each comparator output has an equal magnitude; and
generating a set of output bits by slicing the set of comparator outputs.

8. The method of claim 7, wherein the respective set of input-weighting coefficients corresponds to a respective row of the set of rows of a code receiver matrix.

9. The method of claim 4, wherein the normalized set of input signals are selected from a basis vector [0, ±⅜, ±¼, ±⅜, ±¼, ±⅜].

10. An apparatus comprising:
an encoder configured to receive a set of input signals, and to responsively generate symbols of a normalized-gain codeword based on a weighted sum of a set of subchannels, each subchannel weighted with a corresponding input signal, wherein the set of subchannels correspond to rows of a set of rows selected from a normalized orthogonal matrix, each row of the set of rows (i) mutually orthogonal and (ii) orthogonal to an all-one row, wherein a first number of symbols of the normalized-gain codeword affected by a first subchannel is different from a second number of symbols of the normalized-gain codeword affected by a second subchannel, the first and second subchannels having equal subchannel gain; and
a plurality of line drivers configured to transmit the symbols of the normalized-gain codeword on a plurality of wires of a multi-wire bus, each symbol of the normalized-gain codeword transmitted via a respective wire of the plurality of wires of the multi-wire bus multiwire bus.

11. The apparatus of claim 10, wherein the normalized orthogonal matrix is represented by the matrix:

$$\begin{pmatrix} 1 & 1 & 1 & 1 & 1 & 1 \\ \frac{3}{8} & -\frac{3}{8} & 0 & 0 & 0 & 0 \\ \frac{1}{4} & \frac{1}{4} & -\frac{1}{2} & 0 & 0 & 0 \\ 0 & 0 & 0 & \frac{3}{8} & -\frac{3}{8} & 0 \\ 0 & 0 & 0 & \frac{1}{4} & \frac{1}{4} & -\frac{1}{2} \\ \frac{3}{8} & \frac{3}{8} & \frac{3}{8} & -\frac{3}{8} & -\frac{3}{8} & -\frac{3}{8} \end{pmatrix}$$

12. The apparatus of claim 10, wherein the normalized orthogonal matrix is generated from an unnormalized matrix, and wherein the apparatus further comprises:
a scaling unit configured to generate a normalized set of input signals by adjusting signal levels of the received input signals, and to weight subchannels of the unnormalized matrix with corresponding signals of the normalized set of input signals.

13. The apparatus of claim 12, wherein the unnormalized matrix is represented by the matrix:

$$\begin{pmatrix} 1 & 1 & 1 & 1 & 1 & 1 \\ 1 & -1 & 0 & 0 & 0 & 0 \\ 1 & 1 & -2 & 0 & 0 & 0 \\ 0 & 0 & 0 & 1 & -1 & 0 \\ 0 & 0 & 0 & 1 & 1 & -2 \\ 1 & 1 & 1 & -1 & -1 & -1 \end{pmatrix}$$

14. The apparatus of claim 13, wherein the normalized set of input signals are selected from a basis vector [0, ±⅜, ±¼, ±⅜, ±¼, ±⅜].

15. The apparatus of claim 12, wherein the scaling unit is configured to adjust signal levels of lower-magnitude signals to a magnitude of a highest-magnitude signal of the set of input signals.

16. The apparatus of claim 12, wherein the scaling unit is configured to adjust signal levels of higher-magnitude signals to a magnitude of a lower-magnitude signal of the set of input signals.

17. The apparatus of claim 10, further comprising:

a plurality of multi-input comparators (MICs) configured to receive the symbols of the normalized-gain codeword via the multi-wire bus, and to generate a set of comparator outputs, each comparator output generated based on a respective combination of a respective subset of symbols of the normalized-gain codeword according to a respective set of input-weighting coefficients, and wherein each comparator output has an equal magnitude; and a plurality of slicers configured to generate a set of output bits by slicing the set of comparator outputs.

18. The apparatus of claim 17, wherein the respective set of input-weighting coefficients corresponds to a respective row of the set of rows of a code receiver matrix.

* * * * *